US009485804B1

United States Patent
Evans

(10) Patent No.: US 9,485,804 B1
(45) Date of Patent: *Nov. 1, 2016

(54) HIGH-SPEED WAN TO WIRELESS LAN GATEWAY

(71) Applicant: Qurio Holdings, Inc., Raleigh, NC (US)

(72) Inventor: Gregory M. Evans, Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/512,750

(22) Filed: Oct. 13, 2014

Related U.S. Application Data

(63) Continuation of application No. 13/329,992, filed on Dec. 19, 2011, now Pat. No. 8,879,567, which is a continuation of application No. 11/475,360, filed on Jun. 27, 2006, now Pat. No. 8,102,863.

(51) Int. Cl.
| | |
|---|---|
| *H04W 88/16* | (2009.01) |
| *H04W 36/22* | (2009.01) |
| *H04L 29/06* | (2006.01) |
| *H04W 84/12* | (2009.01) |
| *H04L 12/40* | (2006.01) |

(52) U.S. Cl.
CPC ........ *H04W 88/16* (2013.01); *H04L 29/06503* (2013.01); *H04W 36/22* (2013.01); *H04L 12/4013* (2013.01); *H04W 84/12* (2013.01)

(58) Field of Classification Search
USPC .......................................................... 370/401
See application file for complete search history.

(56) References Cited

U.S. PATENT DOCUMENTS

| | | | |
|---|---|---|---|
| 4,746,919 A | 5/1988 | Reitmeier | |
| 5,278,834 A | 1/1994 | Mazzola | |
| 5,613,004 A | 3/1997 | Cooperman et al. | |
| 5,687,236 A | 11/1997 | Moskowitz et al. | |
| 5,758,257 A | 5/1998 | Herz et al. | |
| 5,790,935 A | 8/1998 | Payton | |
| 5,818,838 A * | 10/1998 | Backes et al. | ................ 370/390 |
| 5,905,800 A | 5/1999 | Moskowitz et al. | |

(Continued)

FOREIGN PATENT DOCUMENTS

| | | |
|---|---|---|
| GB | 2306869 A | 5/1997 |
| WO | 0040021 A1 | 7/2000 |

(Continued)

OTHER PUBLICATIONS

U.S. Appl. No. 11/443,761, filed May 31, 2006, now U.S. Pat. No. 7,656,849.

(Continued)

*Primary Examiner* — Warner Wong

(57) ABSTRACT

A gateway interconnecting a high speed Wide Area Network (WAN) and a lower speed Wireless Local Area Network (WLAN) is provided. The high speed WAN is preferably connected to the gateway via a Fiber-to-the Home (FTTH) connection and associated FTTH modem. In general, the gateway includes an adaptable cross-layer offload engine operating to manage bandwidth between the high speed WAN and the lower speed WLAN. As data enters the gateway from the WAN at the high speed data rate of the WAN, the offload engine stores the data in a non-secure data cache. A rule check engine performs a stateless or stateful inspection of the data in the non-secure data cache. Thereafter, the data is moved from the non-secure data cache to a secure data cache and thereafter transmitted to an appropriate user device in the WLAN at the lower data rate of the WLAN.

54 Claims, 4 Drawing Sheets

(56) References Cited

U.S. PATENT DOCUMENTS

| | | | |
|---|---|---|---|
| 6,076,108 A | 6/2000 | Courts et al. | |
| 6,128,736 A | 10/2000 | Miller | |
| 6,141,753 A | 10/2000 | Zhao et al. | |
| 6,185,678 B1 | 2/2001 | Arbaugh et al. | |
| 6,263,503 B1 | 7/2001 | Margulis | |
| 6,282,299 B1 | 8/2001 | Tewfik et al. | |
| 6,370,584 B1 | 4/2002 | Bestavros et al. | |
| 6,385,641 B1 | 5/2002 | Jiang et al. | |
| 6,389,541 B1 | 5/2002 | Patterson | |
| 6,411,946 B1 | 6/2002 | Chaudhuri | |
| 6,470,332 B1 | 10/2002 | Weschler | |
| 6,470,389 B1 | 10/2002 | Chung et al. | |
| 6,493,875 B1 | 12/2002 | Eames et al. | |
| 6,510,234 B1 | 1/2003 | Cox et al. | |
| 6,529,949 B1 | 3/2003 | Getsin et al. | |
| 6,662,231 B1 | 12/2003 | Drosset et al. | |
| 6,665,536 B1 | 12/2003 | Mahany | |
| 6,704,317 B1 * | 3/2004 | Dobson | 370/401 |
| 6,721,282 B2 | 4/2004 | Motley | |
| 6,735,699 B1 | 5/2004 | Sasaki et al. | |
| 6,738,493 B1 | 5/2004 | Cox et al. | |
| 6,748,080 B2 | 6/2004 | Russ et al. | |
| 6,751,670 B1 | 6/2004 | Patterson | |
| 6,774,926 B1 | 8/2004 | Ellis et al. | |
| 6,789,116 B1 | 9/2004 | Sarkissian et al. | |
| 6,791,962 B2 | 9/2004 | Wentink | |
| 6,804,779 B1 | 10/2004 | Carroni et al. | |
| 6,839,751 B1 | 1/2005 | Dietz et al. | |
| 6,865,605 B1 | 3/2005 | Soderberg et al. | |
| 6,871,236 B2 | 3/2005 | Fishman et al. | |
| 6,889,385 B1 | 5/2005 | Rakib et al. | |
| 6,891,766 B2 | 5/2005 | Choi et al. | |
| 6,891,796 B1 | 5/2005 | Manis et al. | |
| 6,914,551 B2 | 7/2005 | Vidal | |
| 6,928,433 B2 | 8/2005 | Goodman et al. | |
| 6,941,324 B2 | 9/2005 | Plastina et al. | |
| 6,970,848 B2 | 11/2005 | Osaka et al. | |
| 6,975,743 B2 | 12/2005 | Venkatesan et al. | |
| 6,987,985 B2 | 1/2006 | Purkayastha et al. | |
| 7,002,955 B1 | 2/2006 | Kanuri et al. | |
| 7,003,131 B2 | 2/2006 | Watson et al. | |
| 7,016,668 B2 | 3/2006 | Vaidyanathan et al. | |
| 7,020,304 B2 | 3/2006 | Alattar et al. | |
| 7,036,024 B2 | 4/2006 | Watson | |
| 7,039,562 B1 | 5/2006 | Notani et al. | |
| 7,065,607 B2 | 6/2006 | England et al. | |
| 7,120,253 B2 | 10/2006 | Ducharme et al. | |
| 7,130,872 B2 | 10/2006 | de Bonet | |
| 7,149,807 B1 | 12/2006 | Kontothanassis | |
| 7,167,677 B2 | 1/2007 | Jung | |
| 7,203,744 B1 | 4/2007 | Parekh et al. | |
| 7,263,545 B2 | 8/2007 | Digate et al. | |
| 7,305,697 B2 | 12/2007 | Alao et al. | |
| 7,308,489 B2 | 12/2007 | Weast | |
| 7,313,811 B1 | 12/2007 | Sheppard et al. | |
| 7,356,013 B2 | 4/2008 | Linder et al. | |
| 7,356,334 B2 | 4/2008 | Yamashita | |
| 7,376,790 B2 | 5/2008 | Lango et al. | |
| 7,382,879 B1 | 6/2008 | Miller | |
| 7,409,556 B2 | 8/2008 | Wu et al. | |
| 7,412,579 B2 | 8/2008 | O'Connor et al. | |
| 7,424,024 B2 | 9/2008 | Chen et al. | |
| 7,430,302 B2 | 9/2008 | Thorwirth | |
| 7,483,958 B1 | 1/2009 | Elabbady et al. | |
| 7,512,973 B1 | 3/2009 | Chan et al. | |
| 7,522,571 B2 | 4/2009 | Ginzburg | |
| 7,535,465 B2 | 5/2009 | Morse et al. | |
| 7,571,014 B1 | 8/2009 | Lambourne et al. | |
| 7,573,820 B2 | 8/2009 | Krishnaswamy et al. | |
| 7,607,170 B2 | 10/2009 | Chesla | |
| 7,624,436 B2 | 11/2009 | Balakrishnan et al. | |
| 7,647,614 B2 | 1/2010 | Krikorian et al. | |
| 7,656,849 B1 | 2/2010 | Evans | |
| 7,698,723 B2 | 4/2010 | Hicks, III et al. | |
| 7,702,279 B2 | 4/2010 | Ko et al. | |
| 7,733,772 B2 | 6/2010 | Hazra et al. | |
| 7,733,908 B1 | 6/2010 | Evans | |
| 7,739,658 B2 | 6/2010 | Watson et al. | |
| 7,769,851 B1 | 8/2010 | Guruswamy et al. | |
| 7,787,904 B2 | 8/2010 | Issa | |
| 7,792,865 B2 | 9/2010 | Hamada et al. | |
| 7,801,945 B1 | 9/2010 | Geddes et al. | |
| 7,895,442 B1 | 2/2011 | Adams et al. | |
| 7,895,633 B2 | 2/2011 | Van Hoff et al. | |
| 7,908,627 B2 * | 3/2011 | Ansari | H04N 7/163 |
| | | | 375/240 |
| 7,945,934 B2 | 5/2011 | Margis et al. | |
| 7,949,333 B2 | 5/2011 | Issa | |
| 7,987,490 B2 | 7/2011 | Ansari et al. | |
| 8,054,815 B2 | 11/2011 | Evans | |
| 8,102,863 B1 | 1/2012 | Evans | |
| 8,145,203 B2 | 3/2012 | Issa | |
| 8,171,520 B2 | 5/2012 | Arnold et al. | |
| 8,259,861 B2 | 9/2012 | Kuhtz | |
| RE44,104 E | 3/2013 | Evans | |
| 8,479,238 B2 | 7/2013 | Chen et al. | |
| RE44,798 E | 3/2014 | Evans | |
| 8,689,265 B2 | 4/2014 | Lockett et al. | |
| 8,713,605 B2 | 4/2014 | Van Hoff et al. | |
| 8,879,567 B1 | 11/2014 | Evans | |
| 8,908,699 B2 | 12/2014 | Karaoguz et al. | |
| 2001/0018858 A1 | 9/2001 | Dwek | |
| 2001/0023460 A1 * | 9/2001 | Boucher et al. | 709/250 |
| 2001/0033244 A1 | 10/2001 | Harris et al. | |
| 2001/0051996 A1 | 12/2001 | Cooper et al. | |
| 2002/0010759 A1 | 1/2002 | Hitson et al. | |
| 2002/0013812 A1 | 1/2002 | Krueger et al. | |
| 2002/0031120 A1 | 3/2002 | Rakib | |
| 2002/0049580 A1 | 4/2002 | Kutaragi et al. | |
| 2002/0054578 A1 | 5/2002 | Zhang et al. | |
| 2002/0061029 A1 | 5/2002 | Dillon | |
| 2002/0090089 A1 | 7/2002 | Branigan et al. | |
| 2002/0104003 A1 | 8/2002 | Iwamura | |
| 2002/0104015 A1 | 8/2002 | Barzilai et al. | |
| 2002/0104099 A1 | 8/2002 | Novak | |
| 2002/0107934 A1 | 8/2002 | Lowery et al. | |
| 2002/0110123 A1 | 8/2002 | Shitama | |
| 2002/0114336 A1 | 8/2002 | Chow | |
| 2002/0129367 A1 | 9/2002 | Devara | |
| 2002/0144267 A1 | 10/2002 | Gutta et al. | |
| 2002/0156842 A1 | 10/2002 | Signes et al. | |
| 2002/0168082 A1 | 11/2002 | Razdan | |
| 2002/0199203 A1 | 12/2002 | Duffy et al. | |
| 2003/0009769 A1 | 1/2003 | Hensgen et al. | |
| 2003/0012403 A1 | 1/2003 | Rhoads et al. | |
| 2003/0033413 A1 | 2/2003 | Willson, Jr. et al. | |
| 2003/0046270 A1 | 3/2003 | Leung et al. | |
| 2003/0050055 A1 | 3/2003 | Ting et al. | |
| 2003/0050058 A1 | 3/2003 | Walsh et al. | |
| 2003/0058836 A1 | 3/2003 | Even | |
| 2003/0061606 A1 | 3/2003 | Hartwig et al. | |
| 2003/0071117 A1 | 4/2003 | Meade, II | |
| 2003/0073412 A1 | 4/2003 | Meade, II | |
| 2003/0081580 A1 | 5/2003 | Vaidyanathan et al. | |
| 2003/0093665 A1 | 5/2003 | Cooper et al. | |
| 2003/0110234 A1 | 6/2003 | Egli et al. | |
| 2003/0115351 A1 | 6/2003 | Giobbi | |
| 2003/0126086 A1 | 7/2003 | Safadi | |
| 2003/0145325 A1 | 7/2003 | Finster et al. | |
| 2003/0152096 A1 | 8/2003 | Chapman | |
| 2003/0161268 A1 | 8/2003 | Larsson et al. | |
| 2003/0182315 A1 | 9/2003 | Plastina et al. | |
| 2003/0193426 A1 | 10/2003 | Vidal | |
| 2003/0217099 A1 | 11/2003 | Bobde et al. | |
| 2004/0006615 A1 | 1/2004 | Jackson | |
| 2004/0008864 A1 | 1/2004 | Watson et al. | |
| 2004/0009751 A1 | 1/2004 | Michaelis et al. | |
| 2004/0010692 A1 | 1/2004 | Watson | |
| 2004/0010694 A1 | 1/2004 | Collens et al. | |
| 2004/0030798 A1 | 2/2004 | Andersson et al. | |
| 2004/0042421 A1 | 3/2004 | Mahany | |
| 2004/0049787 A1 | 3/2004 | Maissel et al. | |
| 2004/0070593 A1 | 4/2004 | Neely et al. | |
| 2004/0073610 A1 | 4/2004 | Terada et al. | |

(56) References Cited

U.S. PATENT DOCUMENTS

| | | |
|---|---|---|
| 2004/0083487 A1 | 4/2004 | Collens et al. |
| 2004/0086122 A1 | 5/2004 | Watson |
| 2004/0088369 A1 | 5/2004 | Yeager et al. |
| 2004/0088557 A1 | 5/2004 | Malcolm et al. |
| 2004/0117824 A1 | 6/2004 | Karaoguz et al. |
| 2004/0139047 A1 | 7/2004 | Rechsteiner et al. |
| 2004/0156528 A1 | 8/2004 | Joo et al. |
| 2004/0187005 A1 | 9/2004 | Molaro |
| 2004/0199630 A1 | 10/2004 | Sarkissian et al. |
| 2004/0224638 A1 | 11/2004 | Fadell et al. |
| 2004/0240405 A1 | 12/2004 | Okazaki |
| 2004/0242224 A1 | 12/2004 | Janik et al. |
| 2004/0248615 A1 | 12/2004 | Purkayastha et al. |
| 2004/0252651 A1* | 12/2004 | Karlsen et al. ............... 370/264 |
| 2004/0254998 A1 | 12/2004 | Horvitz |
| 2004/0263941 A1 | 12/2004 | Chen et al. |
| 2004/0264372 A1 | 12/2004 | Huang |
| 2004/0267900 A1 | 12/2004 | Hoekstra et al. |
| 2005/0008017 A1 | 1/2005 | Datta et al. |
| 2005/0009561 A1 | 1/2005 | Hollstrom et al. |
| 2005/0010664 A1 | 1/2005 | Hubbard |
| 2005/0021418 A1 | 1/2005 | Marcus et al. |
| 2005/0030976 A1 | 2/2005 | Wentink |
| 2005/0034001 A1 | 2/2005 | Pontarelli |
| 2005/0036469 A1 | 2/2005 | Wentink |
| 2005/0044422 A1 | 2/2005 | Cantrell et al. |
| 2005/0050103 A1 | 3/2005 | Kesteloot et al. |
| 2005/0057538 A1 | 3/2005 | Morse et al. |
| 2005/0065891 A1 | 3/2005 | Lee et al. |
| 2005/0081042 A1 | 4/2005 | Venkatesan et al. |
| 2005/0086069 A1 | 4/2005 | Watson et al. |
| 2005/0097331 A1 | 5/2005 | Majidimehr et al. |
| 2005/0097595 A1 | 5/2005 | Lipsanen et al. |
| 2005/0108769 A1 | 5/2005 | Arnold et al. |
| 2005/0120091 A1 | 6/2005 | Casais et al. |
| 2005/0120127 A1 | 6/2005 | Bradley et al. |
| 2005/0125405 A1 | 6/2005 | Watson et al. |
| 2005/0130586 A1 | 6/2005 | Gnuschke et al. |
| 2005/0135305 A1 | 6/2005 | Wentink |
| 2005/0143123 A1 | 6/2005 | Black et al. |
| 2005/0165828 A1 | 7/2005 | Lango et al. |
| 2005/0169473 A1 | 8/2005 | Candelore |
| 2005/0169632 A1 | 8/2005 | Song et al. |
| 2005/0182989 A1 | 8/2005 | Zarnke et al. |
| 2005/0183120 A1 | 8/2005 | Jain et al. |
| 2005/0192987 A1 | 9/2005 | Marsh |
| 2005/0201340 A1 | 9/2005 | Wang et al. |
| 2005/0201726 A1 | 9/2005 | Malcolm et al. |
| 2005/0216941 A1 | 9/2005 | Flanagan et al. |
| 2005/0216942 A1 | 9/2005 | Barton |
| 2005/0220321 A1 | 10/2005 | Langelaar |
| 2005/0221858 A1 | 10/2005 | Hoddie |
| 2005/0227773 A1 | 10/2005 | Lu et al. |
| 2005/0229246 A1 | 10/2005 | Rajagopal et al. |
| 2005/0232284 A1 | 10/2005 | Karaoguz et al. |
| 2005/0238012 A1 | 10/2005 | Panigrahy et al. |
| 2005/0239497 A1 | 10/2005 | Bahl et al. |
| 2005/0251491 A1 | 11/2005 | Medina et al. |
| 2005/0259668 A1 | 11/2005 | Kim |
| 2005/0281194 A1 | 12/2005 | Sonoda |
| 2005/0286438 A1 | 12/2005 | Rajkotia |
| 2006/0002377 A1 | 1/2006 | Skog et al. |
| 2006/0008256 A1 | 1/2006 | Khedouri et al. |
| 2006/0010274 A1 | 1/2006 | Olson |
| 2006/0015735 A1 | 1/2006 | Kudo et al. |
| 2006/0020589 A1 | 1/2006 | Wu et al. |
| 2006/0037077 A1 | 2/2006 | Gadde et al. |
| 2006/0041655 A1 | 2/2006 | Holloway et al. |
| 2006/0048185 A1 | 3/2006 | Alterman |
| 2006/0048186 A1 | 3/2006 | Alterman |
| 2006/0050880 A1 | 3/2006 | Taylor et al. |
| 2006/0053452 A1 | 3/2006 | Lee et al. |
| 2006/0056349 A1 | 3/2006 | Nakatugawa et al. |
| 2006/0059560 A1 | 3/2006 | Montulli |
| 2006/0072786 A1 | 4/2006 | Watson et al. |
| 2006/0075243 A1 | 4/2006 | Lakamp et al. |
| 2006/0080707 A1 | 4/2006 | Laksono |
| 2006/0085830 A1 | 4/2006 | Bruck et al. |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095792 A1 | 5/2006 | Hurtado et al. |
| 2006/0105764 A1 | 5/2006 | Krishnaswamy et al. |
| 2006/0114832 A1 | 6/2006 | Hamilton et al. |
| 2006/0123235 A1 | 6/2006 | Vanstone |
| 2006/0127037 A1 | 6/2006 | Van Hoff et al. |
| 2006/0129672 A1 | 6/2006 | Mayer |
| 2006/0129810 A1 | 6/2006 | Jeong et al. |
| 2006/0133644 A1 | 6/2006 | Wells et al. |
| 2006/0136694 A1 | 6/2006 | Hasbun et al. |
| 2006/0156003 A1 | 7/2006 | Zhang et al. |
| 2006/0161776 A1 | 7/2006 | Van Der Veen et al. |
| 2006/0173794 A1 | 8/2006 | Sellars et al. |
| 2006/0174128 A1 | 8/2006 | Yuval |
| 2006/0182101 A1 | 8/2006 | Hoekstra et al. |
| 2006/0200415 A1 | 9/2006 | Lu |
| 2006/0200416 A1 | 9/2006 | White et al. |
| 2006/0206933 A1 | 9/2006 | Molen et al. |
| 2006/0215596 A1 | 9/2006 | Krishnaswamy et al. |
| 2006/0233101 A1 | 10/2006 | Luft et al. |
| 2006/0268933 A1 | 11/2006 | Kellerer et al. |
| 2006/0270415 A1 | 11/2006 | Waxman |
| 2006/0277271 A1 | 12/2006 | Morse et al. |
| 2007/0002742 A1 | 1/2007 | Krishnaswamy et al. |
| 2007/0008978 A1 | 1/2007 | Pirzada et al. |
| 2007/0048712 A1 | 3/2007 | Plastina et al. |
| 2007/0058561 A1 | 3/2007 | Virgile |
| 2007/0061488 A1 | 3/2007 | Alagappan et al. |
| 2007/0061580 A1 | 3/2007 | Venkatesan et al. |
| 2007/0064643 A1 | 3/2007 | Tavares |
| 2007/0110080 A1 | 5/2007 | Bennett |
| 2007/0133673 A1 | 6/2007 | Imaizumi |
| 2007/0160017 A1 | 7/2007 | Meier et al. |
| 2007/0174471 A1 | 7/2007 | Van Rossum |
| 2007/0214237 A1 | 9/2007 | Stibel et al. |
| 2007/0223437 A1 | 9/2007 | Virgile |
| 2007/0266134 A1 | 11/2007 | Shyy et al. |
| 2007/0282847 A1 | 12/2007 | Gwozdz |
| 2008/0044087 A1 | 2/2008 | Levy et al. |
| 2008/0220775 A1 | 9/2008 | Tischer et al. |
| 2009/0037388 A1 | 2/2009 | Cooper et al. |
| 2009/0067328 A1* | 3/2009 | Morris et al. ............... 370/230.1 |
| 2009/0133116 A1* | 5/2009 | Waisbard et al. ............... 726/17 |
| 2009/0137009 A1 | 5/2009 | Lai et al. |
| 2009/0287837 A1 | 11/2009 | Felsher |
| 2010/0020685 A1* | 1/2010 | Short et al. ................... 370/230 |
| 2010/0174770 A1 | 7/2010 | Pandya |
| 2011/0087750 A1 | 4/2011 | Gwozdz |

FOREIGN PATENT DOCUMENTS

| | | |
|---|---|---|
| WO | 0069163 A2 | 11/2000 |
| WO | 0125948 A1 | 4/2001 |
| WO | 02052540 A1 | 7/2002 |
| WO | 02056536 A1 | 7/2002 |
| WO | 03094510 A1 | 11/2003 |
| WO | 2004008693 A1 | 1/2004 |
| WO | 2006046099 A2 | 5/2006 |
| WO | 2007056707 A2 | 5/2007 |

OTHER PUBLICATIONS

U.S. Appl. No. 12/647,923, filed Dec. 28, 2009, now U.S. Pat. No. 8,054,815.

U.S. Appl. No. 13/284,046, filed Oct. 28, 2011.

U.S. Appl. No. 13/715,083, filed Dec. 14, 2012.

U.S. Appl. No. 11/443,882, filed May 31, 2006, now U.S. Pat. No. 7,733,908.

U.S. Appl. No. 13/490,955, filed Jun. 7, 2012, now U.S. Pat. No. RE44104.

U.S. Appl. No. 13/849,868, filed Mar. 25, 2013, now U.S. Pat. No. RE44,798.

(56) References Cited

OTHER PUBLICATIONS

U.S. Appl. No. 14/171,095, filed Feb. 3, 2014.
U.S. Appl. No. 11/471,835, filed Jun. 21, 2006, now U.S. Pat. No. 8,055,803.
U.S. Appl. No. 13/289,000, filed Nov. 4, 2011, now U.S. Pat. No. 8,291,017.
U.S. Appl. No. 11/471,751, filed Jun. 21, 2006, now U.S. Pat. No. 8,244,855.
U.S. Appl. No. 11/471,868, filed Jun. 21, 2006, now U.S. Pat. No. 8,150,938.
U.S. Appl. No. 11/475,360, filed Jun. 27, 2006, now U.S. Pat. No. 8,102,863.
U.S. Appl. No. 13/329,992, filed Dec. 19, 2011, now U.S. Pat. No. 8,879,567.
U.S. Appl. No. 11/536,135, filed Sep. 28, 2006, now U.S. Pat. No. 8,615,778.
U.S. Appl. No. 14/136,553, filed Dec. 20, 2013.
U.S. Appl. No. 11/555,707, filed Nov. 2, 2006, now U.S. Pat. No. 7,738,676.
U.S. Appl. No. 12/772,374, filed May 3, 2010, now U.S. Pat. No. 7,983,444.
U.S. Appl. No. 13/162,673, filed Jun. 17, 2011, now U.S. Pat. No. 8,320,610.
U.S. Appl. No. 13/668,934, filed Nov. 5, 2012, now U.S. Pat. No. 8,630,450.
U.S. Appl. No. 14/133,755, filed Dec. 19, 2013.
U.S. Appl. No. 11/611,188, filed Dec. 15, 2006, now U.S. Pat. No. 8,000,474.
U.S. Appl. No. 13/052,705, filed Mar. 21, 2011.
Lee, Sangjae et al., "FTTH Residential Gateway and IP Tuner for IPTV Service," Presented at the 3rd Consumer communications and Networking Conference, Jan. 8-10, 2006, IEEE, pp. 497-501.
Miao, Zhourong, et al., "Proxy Caching for Efficient Video Services over the Internet," In 9th International Packet Video Workshop, 1999, 21 pages.
Myers, Brad, "Using handhelds for wireless remote control of PCs and Appliances," Interacting with Computers, vol. 17, 2005, available online Jul. 28, 2004, Elsevier BV., 14 pages.
Newton, Harry, "buffer," Newton's Telecom Dictionary (excerpt), 18th Edition, Feb. 2002, CMP Books, New York, New York, 4 pages.
Peinado, Marcus, "Digital Rights Management in a Multimedia Environment," SMPTE Journal, vol. 11, Issue 4, Apr. 2002, SMPTE, pp. 159-163.
Rasheed, Yasser et al., "Home Interoperability Framework for the Digital Home," Intel Technology Journal, vol. 6, Issue 4, Nov. 15, 2002, 14 pages.
Saito, Takeshi, et al., "Gateway Technologies for Home Network and Their Implementations," International conference on Distributed Computing Systems Workshop, Apr. 2001, IEEE, pp. 175-180.
Taesombut, Nut et al., "A Secure Multimedia System in Emerging Wireless Home Networks," Lecture Notes in computer Science, vol. 2828, 2003, Springer Berlin Heidelberg, pp. 76-88.
Tanenbaum, Andrew, "Computer Networks," (book), 4th Edition, 2003, Pearson Education, Inc., Upper Saddle River, New Jersey, 671 pages.
Tarasewich, Peter, "Wireless Devices for Mobile Commerce: User Interface Design and Usability," Mobile commerce: Technology, Theory, and Applications, Idea Group Publishing, Hershey, Pennsylvania, 2002, 16 pages.
U.S. Appl. No. 60/654,030, filed Feb. 16, 2005, 10 pages.
Wijting, Carl et al., "A Generic Framework for Cross-Layer Optimisation in Wireless Personal Area Networks," Wireless Personal Communications, vol. 29, 2004, Kluwer Academic Publishers, Netherlands, pp. 135-149.
Zhang, Qian et al., "Cross-Layer QoS Support for Multimedia Delivery over Wireless Internet," EURASIP Journal on Applied Signal Processing, vol. 2005, Issue 2, Feb. 2005, Hindawi Publishing Corporation, New York, New York, pp. 207-219.

*DirecTV, LLC* (Petitioner) v. *Qurio Holdings, Inc.* (Patent Owner), Petition for Inter Partes Review of U.S. Pat. No. 8,102,863 B1, dated Oct. 1, 2015, 67 pages.
*DirecTV, LLC* (Petitioner) v. *Qurio Holdings, Inc.* (Patent Owner), Petition for Inter Partes Review of U.S. Pat. No. 8,879,567 B1, dated Oct. 1, 2015, 67 pages.
*Unified Patents Inc.* (Petitioner) v. *Qurio Holidings, Inc.* (Patent Owner), Petition for Inter Partes Review of U.S. Pat. No. 8,102,863, dated Sep. 22, 2015, 66 pages.
Labeled Claim Language of Claims 1-21 of U.S. Pat. No. 8,102,863 B1, Exhibit 1032 of Petition for Inter Partes Rieview of U.S. Pat. No. 8,102,863 B1, dated Oct. 1, 2015, 8 pages.
Labeled Claim Language of Claims 1-34 of U.S. Pat. No. 8,879,567 B1, Exhibit 1032 of Petition for Inter Partes Review of U.S. Pat. No. 8,879,567 B1, dated Oct. 1, 2015, 12 pages.
*Qurio Holdings, Inc.* (Plaintiff) v. *Dish Network L.L.C.* (Defendant), Defendant's Initial Invalidity Contentions, Civil Action No. 15-cv-00930-HSG, dated Aug. 3, 2015, 67 pages.
*Unified Patents Inc.* (Petitioner) v. *Qurio Holidings, Inc.* (Patent Owner), Petition for Inter Partes Review of U.S. Pat. No. 7,787,904, dated Sep. 28, 2015, 66 pages.
*Durio Holdings, Inc.* (Plaintiff) v. *DirecTV, LLC* (Defendant), DirecTV's Initial Unenforceability and Invalidity Contentions Pursuant to Local Patent Rule 2.3(b), dated Mar. 4, 2015, 34 pages.
Petition for Inter Partes Review of Claims 17, 18, 20, 21, of U.S. Pat. No. 8,102,863 Under 35 U.S.C. §§ 311-319 and 37 C.F.R. §§ 42.100 Et Seq., dated Oct. 1, 2015, 66 pages.
Petition for Inter Partes Review of Claims 1, 2, 3, 4, 7, 10, 12, 13, 14, 15, 16, 17, 18, and 20 of U.S. Pat. No. 7,787,904, dated Oct. 2, 2015, 64 pages.
Petition for Inter Partes Review of Claims 20, 21, 24 and 25 of U.S. Pat. No. 8,879,567 Under 35 U.S.C. §§ 311-319 and 37 C.F.R. §§ 42.100 Et Seq., dated Oct. 23, 2015, 69 pages.
*DirecTV, LLC* (Petitioner) V. *Qurio Holdings, Inc.* (Patent Owner), Case: IPR2015-02005, Notice of Substitute Petition for Inter Partes Review of U.S. Pat. No. 7,787,904 B2, dated Oct. 1, 2015, 142 pages.
*DirecTV, LLC* (Petitioner) v. *Qurio Holdings, Inc.* (Patent Owner), Case: IPR2015-02005, Substitute Petition for Inter Partes Review of U.S. Pat. No. 7,787,904 B2, dated Oct. 1, 2015, 65 pages.
Petitioner's Voluntary Interrogatory Responses in *Unified Patents Inc.* (Petitioner) v. *Qurio Holdings, Inc.* (Patent Owner), included with exhibits in Inter Partes Review of U.S. Pat. No. 8,102,863, dated Sep. 22, 2015, 8 pages.
*Dish Network LLC* (Petitioner) v. *Qurio Holdings, Inc.* (Patent Owner), Patent Owner Preliminary Response, Case IPR2016-00005, dated Jan. 7, 2016, 62 pages.
*Dish Network LLC* (Petitioner) v. *Qurio Holdings, Inc.* (Patent Owner), Patent Owner Preliminary Response, Case IPR2016-00080, dated Feb. 4, 2016, 59 pages.
*Unified Patents Inc.* (Petitioner) v. *Qurio Holidings, Inc.* (Patent Owner), Patent Owner Preliminary Response, Case IPR2015-01940, dated Jan. 15, 2016, 65 pages.
Petitioner's Voluntary Interrogatory Responses in *Unified Patents Inc.* (Petitioner) v. *Qurio Holdings, Inc.* (Patent Owner), included with exhibits in Inter Partes Review of U.S. Pat. No. 7,787,904, dated Sep. 28, 2015, 8 pages.
*Qurio Holdings, Inc.* (Plaintiff) v. *Dish Network Corporation, and Dish Network, LLC* (Defendants), Complaint for Patent Infringement, Civil Action No. 1:14-cv-07504, filed Sep. 26, 2014, 12 pages.
*Qurio Holdings, Inc.* (Plaintiff) v. *Dish Network Corporation, and Dish Network, LLC* (Defendants), First Amendement Complaint for Patent Infringement, Civil Action No. 14-cv-07504, filed Nov. 13, 2014, 17 pages.
*Qrio Holdings, Inc.* (Plaintiff) v. *Comcast Corporation and Comcast Cable Commmunications, LLC* (Defendants), First Amended Complaint for Patent Infringement, Civil Action No. 1:14-cv-07488, dated Nov. 13, 2014, 23 pages.
*Qurio Holdings, Inc.* (Plaintiff) v. *DirecTV, and DirecTV Holdings, LLC* (Defendants), First Amended complaint for Patent Infringement, Civil Action No. 14-cv-07502, filed Nov. 14, 2014, 19 pages.

(56) References Cited

OTHER PUBLICATIONS

Declaration of Himanshu Parikh in Support of Petition for Inter Partes Review of U.S. Pat. No. 8,102,863 B1 and 3,879,567 B1, dated Sep. 29, 2015, 11 pages.
Declaration of Jon Weissman in Support of Petition for Inter Partes Review of U.S. Pat. No. 8,102,863, dated Sep. 21, 2015, 65 pages.
Declaration of Sarah Hare in Support of Petition for Inter Partes Review of U.S. Pat. No. 8,102,863, dated Oct. 1, 2015, 8 pages.
Declaration of Sarah Hare in Support of Petition for Inter Partes Review of U.S. Pat. No. 8,879,567, dated Oct. 1, 2015, 8 pages.
Declaration of Tal Lavian in Support of Petition for Inter Partes Review of U.S. Pat. No. 8,102,863, dated Oct. 1, 2015, 592 pages.
Declaration of Tal Lavian in Support of Petition for Inter Partes Review of U.S. Pat. No. 8,879,567 B1, dated Oct. 1, 2015, 604 pages.
Expert Declaration of Dr. Kevin Negus for Inter Partes Review of U.S. Pat. No. 8,102,863 and 8,879,567, dated Sep. 30, 2015, 230 pages.
Declaration of Lisa Gade in Support of Petition for Inter Partes Review of U.S. Pat. No. 7,787,904 B2, dated Sep. 16, 2015, 316 pages.
Declaration of Ron Bessems in Support of Petition for Inter Partes Review of U.S. Pat. No. 7,787,904 B2, dated Sep. 28, 2015, 103 pages.
Butler, Christopher, "Affidavit of Christopher Butler," Affidavit confirming the date of "Network Connection Speeds" reference, retrieved by the Internet Archive, using the Wayback Machine, dated Sep. 14, 2015, 7 pages.
Butler, Christopher, "Affidavit of Christopher Butler," Affidavit confirming the dates of references from Inter Jartes Review of U.S. Pat. No. 8,879,567, retrieved by the Internet Archive, using the Wayback Machine, dated Sep. 29, 2015, 843 pages.
Declaration of John de Vet in Support of Petition for Inter Partes Review of U.S. Pat. No. 7,787,904 B2, dated Sep. 17, 2015, 17 pages.
Declaration of Dr. Mark Dunlop, Ph.D., in Support of Petition for Inter Partes Review of U.S. Pat. No. 7,787,904 B2, lated Sep. 25, 2015, 27 pages.
Expert Declaration of Mr. Jeffrey Fischer in Support of Inter Partes Review of U.S. Pat. No. 7,787,904, dated Sep. 30, 2015, 123 pages.
Declaration of Sara Hare in Support of Petition for Inter Partes Review of U.S. Pat. No. 7,787,904 B2, dated Sep. 30, 2015, 6 pages.
Declaration of Tal Lavian, Ph.D., in Support of Petition for Inter Partes Review of U.S. Pat. No. 7,787,904 B2, dated Sep. 30, 2015, 1414 pages.
Declaration of Jon Weissman in Support of Petition for Inter Partes Review of U.S. Pat. No. 7,787,904, dated Sep. 28, 2015, 87 pages.
Exhibit B-01, Claim Chart from DirecTV's Initial Unenforceability and Invalidity Contentions, Case No. 1:14-cv-07502, mailed Mar. 4, 2015, 60 pages.
Exhibit B-02, Claim Chart from DirecTV's Initial Unenforceability and Invalidity Contentions, Case No. 1:14-cv-07502, mailed Mar. 4, 2015, 46 pages.
Exhibit B-03, Claim Chart from DirecTV's Initial Unenforceability and Invalidity Contentions, Case No. 1:14-cv-07502, mailed Mar. 4, 2015, 30 pages.
Exhibit B-04, Claim Chart from DirecTV's Initial Unenforceability and Invalidity Contentions, Case No. 1:14-cv-07502, mailed Mar. 4, 2015, 24 pages.
Exhibit B-05, Claim Chart from DirecTV's Initial Unenforceability and Invalidity Contentions, Case No. 1:14-cv-07502, mailed Mar. 4, 2015, 35 pages.
Exhibit B-06, Claim Chart from DirecTV's Initial Unenforceability and Invalidity Contentions, Case No. 1:14-cv-07502, mailed Mar. 4, 2015, 59 pages.
Exhibit B-07, Claim Chart from DirecTV's Initial Unenforceability and Invalidity Contentions, Case No. 1:14-cv-07502, mailed Mar. 4, 2015, 62 pages.
Exhibit B-08, Claim Chart from DirecTV's Initial Unenforceability and Invalidity Contentions, Case No. 1:14-cv-07502, mailed Mar. 4, 2015, 54 pages.
Exhibit C-01, Claim Chart from DirecTV's Initial Unenforceability and Invalidity Contentions, Case No. 1:14-cv-07502, mailed Mar. 4, 2015, 62 pages.
Exhibit C-02, Claim Chart from DirecTV's Initial Unenforceability and Invalidity Contentions, Case No. 1:14-cv-07502, mailed Mar. 4, 2015, 50 pages.
Exhibit C-03, Claim Chart from DirecTV's Initial Unenforceability and Invalidity Contentions, Case No. 1:14-cv-07502, mailed Mar. 4, 2015, 28 pages.
Exhibit C-04, Claim Chart from DirecTV's Initial Unenforceability and Invalidity Contentions, Case No. 1:14-cv-07502, mailed Mar. 4, 2015, 25 pages.
Exhibit C-05, Claim Chart from DirecTV's Initial Unenforceability and Invalidity Contentions, Case No. 1:14-cv-07502, mailed Mar. 4, 2015, 32 pages.
Exhibit C-06, Claim Chart from DirecTV's Initial Unenforceability and Invalidity Contentions, Case No. 1:14-cv-07502, mailed Mar. 4, 2015, 57 pages.
Exhibit C-07, Claim Chart from DirecTV's Initial Unenforceability and Invalidity Contentions, Case No. 1:14-cv-07502, mailed Mar. 4, 2015, 65 pages.
Exhibit C-08, Claim Chart from DirecTV's Initial Unenforceability and Invalidity Contentions, Case No. 1:14-cv-07502, mailed Mar. 4, 2015, 57 pages.
Exhibit A-01, Claim Chart from DirecTV's Initial Unenforceability and Invalidity Contentions, Case No. 1:14-cv-07502, mailed Mar. 4, 2015, 157 pages.
Exhibit A-02, Claim Chart from DirecTV's Initial Unenforceability and Invalidity Contentions, Case No. 1:14-cv-07502, mailed Mar. 4, 2015, 88 pages.
Exhibit A-03, Claim Chart from DirecTV's Initial Unenforceability and Invalidity Contentions, Case No. 1:14-cv-07502, mailed Mar. 4, 2015, 36 pages.
Exhibit A-04, Claim Chart from DirecTV's Initial Unenforceability and Invalidity Contentions, Case No. 1:14-cv-07502, mailed Mar. 4, 2015, 90 pages.
Exhibit A-05, Claim Chart from DirecTV's Initial Unenforceability and Invalidity Contentions, Case No. 1:14-cv-07502, mailed Mar. 4, 2015, 132 pages.
Exhibit A-06, Claim Chart from DirecTV's Initial Unenforceability and Invalidity Contentions, Case No. 1:14-cv-07502, mailed Mar. 4, 2015, 60 pages.
Exhibit A-07, Claim Chart from DirecTV's Initial Unenforceability and Invalidity Contentions, Case No. 1:14-cv-07502, mailed Mar. 4, 2015, 75 pages.
Exhibit A-08, Claim Chart from DirecTV's Initial Unenforceability and Invalidity Contentions, Case No. 1:14-cv-07502, mailed Mar. 4, 2015, 50 pages.
Exhibit A-09, Claim Chart from DirecTV's Initial Unenforceability and Invalidity Contentions, Case No. 1:14-cv-07502, mailed Mar. 4, 2015, 71 pages.
Exhibit A-10, Claim Chart from DirecTV's Initial Unenforceability and Invalidity Contentions, Case No. 1:14-cv-07502, mailed Mar. 4, 2015, 85 pages.
Exhibit A-11, Claim Chart from DirecTV's Initial Unenforceability and Invalidity Contentions, Case No. 1:14-cv-07502, mailed Mar. 4, 2015, 88 pages.
Exhibit A-12, Claim Chart from DirecTV's Initial Unenforceability and Invalidity Contentions, Case No. 1:14-cv-07502, mailed Mar. 4, 2015, 79 pages.
Exhibit A-13, Claim Chart from DirecTV's Initial Unenforceability and Invalidity Contentions, Case No. 1:14-cv-07502, mailed Mar. 4, 2015, 66 pages.
Exhibit A-14, Claim Chart from DirecTV's Initial Unenforceability and Invalidity Contentions, Case No. 1:14-cv-07502, mailed Mar. 4, 2015, 110 pages.
Exhibit A-15, Claim Chart from DirecTV's Initial Unenforceability and Invalidity Contentions, Case No. 1:14-cv-07502, mailed Mar. 4, 2015, 45 pages.

(56) References Cited

OTHER PUBLICATIONS

Exhibit A-01, Claim Chart from Dish Network's Initial Invalidity Contentions, Case No. 15-cv-00930-HSG, dated Aug. 3, 2015, 175 pages.
Exhibit A-02, Claim Chart from Dish Network's Initial Invalidity Contentions, Case No. 15-cv-00930-HSG, dated Aug. 3, 2015, 185 pages.
Exhibit A-03, Claim Chart from Dish Network's Initial Invalidity Contentions, Case No. 15-cv-00930-HSG, dated Aug. 3, 2015, 167 pages.
Exhibit A-04, Claim Chart from Dish Network's Initial Invalidity Contentions, Case No. 15-cv-00930-HSG, dated Aug. 3, 2015, 282 pages.
Exhibit A-05, Claim Chart from Dish Network's Initial Invalidity Contentions, Case No. 15-cv-00930-HSG, dated Aug. 3, 2015, 186 pages.
Exhibit A-06, Claim Chart from Dish Network's Initial Invalidity Contentions, Case No. 15-cv-00930-HSG, dated Aug. 3, 2015, 166 pages.
Exhibit A-07, Claim Chart from Dish Network's Initial Invalidity Contentions, Case No. 15-cv-00930-HSG, dated Aug. 3, 2015, 207 pages.
Exhibit A-08, Claim Chart from Dish Network's Initial Invalidity Contentions, Case No. 15-cv-00930-HSG, dated Aug. 3, 2015, 152 pages.
Exhibit A-09, Claim Chart from Dish Network's Initial Invalidity Contentions, Case No. 15-cv-00930-HSG, dated Aug. 3, 2015, 208 pages.
Exhibit A-10, Claim Chart from Dish Network's Initial Invalidity Contentions, Case No. 15-cv-00930-HSG, dated Aug. 3, 2015, 136 pages.
Exhibit A-11, Claim Chart from Dish Network's Initial Invalidity Contentions, Case No. 15-cv-00930-HSG, dated Aug. 3, 2015, 136 pages.
Exhibit A-12, Claim Chart from Dish Network's Initial Invalidity Contentions, Case No. 15-cv-00930-HSG, dated Aug. 3, 2015, 154 pages.
Exhibit A-13, Claim Chart from Dish Network's Initial Invalidity Contentions, Case No. 15-cv-00930-HSG, dated Aug. 3, 2015, 63 pages.
Exhibit A-14, Claim Chart from Dish Network's Initial Invalidity Contentions, Case No. 15-cv-00930-HSG, dated Aug. 3, 2015, 216 pages.
Exhibit A-15, Claim Chart from Dish Network's Initial Invalidity Contentions, Case No. 15-cv-00930-HSG, dated Aug. 3, 2015, 118 pages.
Exhibit A-16, Claim Chart from Dish Network's Initial Invalidity Contentions, Case No. 15-cv-00930-HSG, dated Aug. 3, 2015, 117 pages.
Exhibit A-17, Claim Chart from Dish Network's Initial Invalidity Contentions, Case No. 15-cv-00930-HSG, dated Aug. 3, 2015, 176 pages.
Exhibit A-18, Claim Chart from Dish Network's Initial Invalidity Contentions, Case No. 15-cv-00930-HSG, dated Aug. 3, 2015, 153 pages.
Exhibit A-19, Claim Chart from Dish Network's Initial Invalidity Contentions, Case No. 15-cv-00930-HSG, dated Aug. 3, 2015, 161 pages.
Exhibit A-20, Claim Chart from Dish Network's Initial Invalidity Contentions, Case No. 15-cv-00930-HSG, dated Aug. 3, 2015, 172 pages.
Exhibit A-21, Claim Chart from Dish Network's Initial Invalidity Contentions, Case No. 15-cv-00930-HSG, dated Aug. 3, 2015, 158 pages.
Exhibit A-22, Claim Chart from Dish Network's Initial Invalidity Contentions, Case No. 15-cv-00930-HSG, dated Aug. 3, 2015, 86 pages.
Exhibit A-23, Claim Chart from Dish Network's Initial Invalidity Contentions, Case No. 15-cv-00930-HSG, dated Aug. 3, 2015, 89 pages.
Exhibit A-24, Claim Chart from Dish Network's Initial Invalidity Contentions, Case No. 15-cv-00930-HSG, dated Aug. 3, 2015, 85 pages.
Exhibit A-25, Claim Chart from Dish Network's Initial Invalidity Contentions, Case No. 15-cv-00930-HSG, dated Aug. 3, 2015, 53 pages.
Exhibit A-26, Claim Chart from Dish Network's Initial Invalidity Contentions, Case No. 15-cv-00930-HSG, dated Aug. 3, 2015, 157 pages.
Exhibit A-27, Claim Chart from Dish Network's Initial Invalidity Contentions, Case No. 15-cv-00930-HSG, dated Aug. 3, 2015, 30 pages.
Exhibit A-28, Claim Chart from Dish Network's Initial Invalidity Contentions, Case No. 15-cv-00930-HSG, dated Aug. 3, 2015, 57 pages.
Exhibit A-29, Claim Chart from Dish Network's Initial Invalidity Contentions, Case No. 15-cv-00930-HSG, dated Aug. 3, 2015, 76 pages.
Exhibit A-30, Claim Chart from Dish Network's Initial Invalidity Contentions, Case No. 15-cv-00930-HSG, dated Aug. 3, 2015, 29 pages.
Exhibit A-31, Claim Chart from Dish Network's Initial Invalidity Contentions, Case No. 15-cv-00930-HSG, dated Aug. 3, 2015, 76 pages.
Exhibit B-01, Claim Chart from Dish Network's Initial Invalidity Contentions, Case No. 15-cv-00930-HSG, dated Aug. 3, 2015, 128 pages.
Exhibit B-02, Claim Chart from Dish Network's Initial Invalidity Contentions, Case No. 15-cv-00930-HSG, dated Aug. 3, 2015, 46 pages.
Exhibit B-03, Claim Chart from Dish Network's Initial Invalidity Contentions, Case No. 15-cv-00930-HSG, dated Aug. 3, 2015, 37 pages.
Exhibit B-04, Claim Chart from Dish Network's Initial Invalidity Contentions, Case No. 15-cv-00930-HSG, dated Aug. 3, 2015, 18 pages.
Exhibit B-05, Claim Chart from Dish Network's Initial Invalidity Contentions, Case No. 15-cv-00930-HSG, dated Aug. 3, 2015, 60 pages.
Exhibit B-06, Claim Chart from Dish Network's Initial Invalidity Contentions, Case No. 15-cv-00930-HSG, dated Aug. 3, 2015, 58 pages.
Exhibit B-07, Claim Chart from Dish Network's Initial Invalidity Contentions, Case No. 15-cv-00930-HSG, dated Aug. 3, 2015, 61 pages.
Exhibit B-08, Claim Chart from Dish Network's Initial Invalidity Contentions, Case No. 15-cv-00930-HSG, dated Aug. 3, 2015, 53 pages.
Exhibit B-09, Claim Chart from Dish Network's Initial Invalidity Contentions, Case No. 15-cv-00930-HSG, dated Aug. 3, 2015, 22 pages.
Exhibit B-10, Claim Chart from Dish Network's Initial Invalidity Contentions, Case No. 15-cv-00930-HSG, dated Aug. 3, 2015, 21 pages.
Exhibit B-11, Claim Chart from Dish Network's Initial Invalidity Contentions, Case No. 15-cv-00930-HSG, dated Aug. 3, 2015, 178 pages.
Exhibit B-12, Claim Chart from Dish Network's Initial Invalidity Contentions, Case No. 15-cv-00930-HSG, dated Aug. 3, 2015, 178 pages.
Exhibit C-01, Claim Chart from Dish Network's Initial Invalidity Contentions, Case No. 15-cv-00930-HSG, dated Aug. 3, 2015, 58 pages.
Exhibit C-02, Claim Chart from Dish Network's Initial Invalidity Contentions, Case No. 15-cv-00930-HSG, dated Aug. 3, 2015, 49 pages.
Exhibit C-03, Claim Chart from Dish Network's Initial Invalidity Contentions, Case No. 15-cv-00930-HSG, dated Aug. 3, 2015, 55 pages.
Exhibit C-04, Claim Chart from Dish Network's Initial Invalidity Contentions, Case No. 15-cv-00930-HSG, dated Aug. 3, 2015, 24 pages.

(56) References Cited

OTHER PUBLICATIONS

Exhibit C-05, Claim Chart from Dish Network's Initial Invalidity Contentions, Case No. 15-cv-00930-HSG, dated Aug. 3, 2015, 31 pages.
Exhibit C-06, Claim Chart from Dish Network's Initial Invalidity Contentions, Case No. 15-cv-00930-HSG, dated Aug. 3, 2015, 55 pages.
Exhibit C-07, Claim Chart from Dish Network's Initial Invalidity Contentions, Case No. 15-cv-00930-HSG, dated Aug. 3, 2015, 64 pages.
Exhibit C-08, Claim Chart from Dish Network's Initial Invalidity Contentions, Case No. 15-cv-00930-HSG, dated Aug. 3, 2015, 55 pages.
Exhibit C-09, Claim Chart from Dish Network's Initial Invalidity Contentions, Case No. 15-cv-00930-HSG, dated Aug. 3, 2015, 68 pages.
Exhibit C-10, Claim Chart from Dish Network's Initial Invalidity Contentions, Case No. 15-cv-00930-HSG, dated Aug. 3, 2015, 51 pages.
Exhibit C-11, Claim Chart from Dish Network's Initial Invalidity Contentions, Case No. 15-cv-00930-HSG, dated Aug. 3, 2015, 60 pages.
Exhibit C-12, Claim Chart from Dish Network's Initial Invalidity Contentions, Case No. 15-cv-00930-HSG, dated Aug. 3, 2015, 71 pages.
Exhibit C-13, Claim Chart from Dish Network's Initial Invalidity Contentions, Case No. 15-cv-00930-HSG, dated Aug. 3, 2015, 64 pages.
Exhibit C-14, Claim Chart from Dish Network's Initial Invalidity Contentions, Case No. 15-cv-00930-HSG, dated Aug. 3, 2015, 30 pages.
Exhibit C-15, Claim Chart from Dish Network's Initial Invalidity Contentions, Case No. 15-cv-00930-HSG, dated Aug. 3, 2015, 32 pages.
Exhibit C-16, Claim Chart from Dish Network's Initial Invalidity Contentions, Case No. 15-cv-00930-HSG, dated Aug. 3, 2015, 260 pages.
Exhibit C-17, Claim Chart from Dish Network's Initial Invalidity Contentions, Case No. 15-cv-00930-HSG, dated Aug. 3, 2015, 260 pages.
*Qurio Holdings, Inc.* (Plaintiff) v. *Dish Network, LLC* (Defendant), Appendix A, to Disclosure of Asserted Claims and Infringement Contentions, for U.S. Pat. No. 8,102,863, in Civil Action No. 15-cv-00930-HSG, dated Oct. 1, 2015, 46 pages.
*Qurio Holdings, Inc.* (Plaintiff) v. *Dish Network, LLC* (Defendant), Appendix B, to Plaintiffs Disclosure of Asserted Claims and Infringement Contentions Pursuant to Patent L. R. 3-1 (U.S. Pat. No. 8,879,567), in Civil Action No. 15-cv-00930-HSG, dated Oct. 1, 2015, 75 pages.
*Qurio Holdings, Inc.* (Plaintiff), v. *Dish Network LLL* (Defendant), Appendix C, Initial Infringement aontentions of Plaintiff Qurio (U.S. Pat. No. 7,787,904), Civil Action No. 15-cv-00930-HSG, Oct. 1, 2015, 95 pages.
Defendants Proposed Claim Constructions for U.S. Pat. No. 7,787,904, for the Petition for Inter Partes Review of U.S. Pat. No. 7,787,904, Oct. 1, 2015, 11 pages.
Labeled Claim Language of Claims 1-20 of U.S. Pat. No. 7,787,904 B2, Exhibit 1026 for Inter Partes Review of U.S. Pat. No. 7,787,904 B2, dated Oct. 1, 2015, 10 pages.
Qurio's Preliminary Proposed Claim Constructions and Disclosure of Supporting Evidence Pursuant to Patent L.R. 4-3 (U.S. Pat. No. 7,787,904), Exhibit C, Oct. 1, 2015, 19 pages.
Qurio's Preliminary Proposed Claim Constructions and Disclosure of Supporting Evidence Pursuant to Patent L.R. 4-3 (U.S. Pat. No. 8,102,863), Exhibit A, Oct. 23, 2015, 38 pages.
Qurio's Preliminary Proposed Claim Constructions and Disclosure of Supporting Evidence Pursuant to Patent L.R. 4-3 (U.S. Pat. No. 8,879,567), Exhibit B, Oct. 23, 2015, 37 pages.
Author Unknown, "Cisco AON: A Network-Based Intelligent Message Routing System," Cisco Systems, Inc., 2006, http://www.cisco.com/en/US/products/ps6438/products_data_sheet0900aecd802c1f9c.html, accessed Jan. 9, 2007, 7 pages.
Author Unknown, "Global-Link KVM over IP Overview," Think Logical, http://www.thinklogical.com/products/globalLink.php, accessed Jul. 13, 2007, 1 page.
Author Unknown, "Double 108Mbps Wireless PC Card (WG511U)" PC Connection, 2006, http://www.pcconnection.com/ProductDetail?sku=5373172&SourceID=k40132, accessed on Apr. 5, 2006, 2 pages.
Author Unknown, "Gefen HDMI CAT-5 Extreme User Manual," Gefen Inc., 2006, 16 pages.
Author Unknown, "Global-Link Product Manual," Rev. C—Jan. 2005, Logical Solutions Inc., 2003, 68 pages.
Author Unknown, "Home Media Features Guide," Series 2, TiVo Inc., 2005, 47 pages.
Author Unknown, "Introducing the World's First 'Legal' HDMI(TM) Distribution Amp with HDCP on Every Port!" PureLink Digital Extender, Dtrovision LLC, No Date, http://www.dtrovision.com, accessed Jul. 13, 2007, 2 pages.
Author Unknown, "Kaleidescape Home Page," Kaleidescape, Inc., 2007, http://www.kaleidescape.com, accessed Jul. 13, 2007, 1 page.
Author Unknown, "Overview: Life is good . . . with MediaMax," Axonix Corporation, 2007, http://www.axonix.com/mediamax/, accessed Jul. 13, 2007, 2 pages.
Author Unknown, "Xtendex(TM) Series ST-C5DVI-150: 150 Foot DVI Video Extender; Installation and Operation Manual, Software Version 1.2," Network Technologies Incorporated, rev. Oct. 4, 2006, http://www.networktechinc.com/pdf/man063.pdf, 11 pages.
Author Unknown, "Xtendex™ HDTV Extender," NTI, 2005, www.nti1.com/hdtv-extend.html, 2 pages.
Author Unknown, "Yahoo! Messenger," Yahoo! Inc., 2007, http://messenger.yahoo.com/chat.php, accessed Jan. 9, 2007, 2 pages.
Degermark, Mikael, et al., "Low-loss TCP/IP Header Compression for Wireless Networks," MOBICOM '96, Proceedings of the Second Annual International Conference on Mobile Computing and Networking, Rye, New York, Nov. 10-12, 1996, 14 pages.
Dittmann, Jana, et al., "Robust MPEG Video Watermarking Technologies," ACM Multimedia, Bristol, UK, Aug. 1998, 10 pages.
Fridrich, Jiri, "Applications of Data Hiding in Digital Images," Tutorial for the ISPACS '98 Conference in Melbourne, Australia, Nov. 4-6, 1998, 33 pages.
IEEE Computer Society, "IEEE: Amendment 8: Medium Access Control (MAC) Quality of Service Enhancements", IEEE Std802.11e, Institute of Electrical and Electronics Engineers, Inc., New York, NY, Nov. 11, 2005, 221 pages.
Judge, Paul, et al., "WHIM: Watermarking Multicast Video with a Hierarchy of Intermediaries," Computer Networks: The International Journal of Computer and Telecommunications Networking, Aug. 21, 2002, vol. 39, No. 6, 9 pages.
Klyne, Graham, et al., eds., "Composite Capability/Preference Profiles (CC/PP): Structure and Vocabularies 1.0," W3C Recommendation Jan. 15, 2004, http://www.w3.org/TR/2004/REC-CCPP-struct-vocab-20040115/, accessed Jan. 9, 2007, 61 pages.
Koch, E., et al., "Towards Robust and Hidden Image Copyright Labeling," Proceedings of the 1995 IEEE Workshop on Nonlinear Signal and Image Processing, Neos Marmaras, Greece, Jun. 20-22, 1995, 4 pages.
Kunigonis, Michael, "FTTH Explained: Delivering Efficient Customer Bandwidth and Enhanced Services," Corning Cable Systems, accessed May 30, 2006, 7 pages.
Raisinghani, Vijay T., et al., "ECLAIR: An Efficient Cross Layer Architecture for Wireless Protocol Stacks," 5th World Wireless Congress, San Francisco, California, May 25-28, 2004, 6 pages.
Setton, Eric, et al., "Cross-Layer Design of Ad Hoc Networks for Real-Time Video Streaming," IEEE Wireless Communications, Aug. 2005, vol. 12, No. 4, 7 pages.
Srivastava, Vineet, et al., "Cross-Layer Design: A Survey and the Road Ahead," IEEE Communications Magazine, Dec. 2005, vol. 43, No. 12, pp. 112-119.
Stam, Nick, "Router-Based Parental Controls," PCMag.com, Aug. 3, 2004, http://www.pcmag.com/article2/0,1759,1619375,00.asp, accessed Jan. 9, 2007, 6 pages.

(56) References Cited

OTHER PUBLICATIONS

Non-Final Office Action for U.S. Appl. No. 11/475,360, mailed Apr. 15, 2009, 10 pages.
Interview Summary for U.S. Appl. No. 11/475,360, mailed Jun. 26, 2009, 2 pages.
Final Office Action for U.S. Appl. No. 11/475,360, mailed Oct. 15, 2009, 13 pages.
Non-Final Office Action for U.S. Appl. No. 11/475,360, mailed Jan. 5, 2010, 11 pages.
Interview Summary for U.S. Appl. No. 11/475,360, mailed Apr. 27, 2010, 4 pages.
Final Office Action for U.S. Appl. No. 11/475,360, mailed Jun. 24, 2010, 17 pages.
Advisory Action for U.S. Appl. No. 111475,360, mailed Sep. 7, 2010, 3 pages.
Notice of Allowance for U.S. Appl. No. 11/475,360, mailed Jan. 12, 2011, 6 pages.
Notice of Allowance for U.S. Appl. No. 11/475,360, mailed Sep. 27, 2011, 7 pages.
Non-Final Office Action for U.S. Appl. No. 13/329,992, mailed Jun. 20, 2013, 27 pages.
Applicant-Initiated Interview Summary for U.S. Appl. No. 13/329,992, mailed Aug. 30, 2013, 3 pages.
Final Office Action for U.S. Appl. No. 13/329,992, mailed Dec. 30, 2013, 28 pages.
Final Office Action for U.S. Appl. No. 13/329,992, mailed Mar. 10, 2014, 27 pages.
Notice of Allowance for U.S. Appl. No. 13/329,992, mailed Jun. 24, 2014, 7 pages.
Notice of Allowance for U.S. Appl. No. 13/329,992, mailed Aug. 29, 2014, 6 pages.
Aragon, Martin et al., "Residential Gateway Viability," published as early as 1998, pp. 1-15.
Author Unknown, "802.15.1: IEEE Standard for Information technology—Telecommunications and Information exchange between systems—Local and metropolitan area networks—Specific requirements," Part 15.1: Wireless medium access control (MAC) and physical layer (PHY) specifications for wireless personal area networks (WPANs), IEEE Computer Society, Jun. 14, 2005, 38 pages.
Author Unknown, "Bluetooth Remote Control 1.0 (free to try, $9,95 to buy)," BluetoothShareware.com, http://www.bluetoothshareware.com/bluetooth_remote_control.asp, accessed Oct. 11, 2005, 2 pages.
Author Unknown, "Bluetooth Remote Control Changes," BluetoothShareware.com, http://www.bluetoothshareware.com/bluetooth_remote_control_changes.asp, accessed Oct. 11, 2005, 3 pages.
Author Unknown, "Bluetooth Remote Control Manual," BluetoothShareware.com, http://www.bluetoothshareware.com/bluetooth_remote_control_manual.asp, accessed Oct. 11, 2005, 3 pages.
Author Unknown, "Bluetooth Remote Control Requirements," BluetoothShareware.com, http://www.bluetoothshareware.com/bluetooth_remote_control_requirements.asp, accessed Oct. 11, 2005, 2 pages.
Author Unknown, "Bluetooth Remote Control Screenshots," BluetoothShareware.com, http://www.bluetoothshareware.com/bluetooth_remote_control_screenshots.asp, accessed Oct. 11, 2005, 5 pages.
Author Unknown, "CableHome—Specifications," Specifications Archive, https://web.archive.org/web/20040608091910/http://www.cablelabs.com/projects/cablehome/specifications, Internet Archive dated Jun. 8, 2004, Cable Television Laboratories, Inc., retrieved on Sep. 15, 2015, 2 pages.
Author Unknown, "CableHome 1.1 Specification," Issued Specification, CH-SP-CH1.1-I04-040409, dated Apr. 9, 2004, Cable Television Laboratories, Inc., 342 pages.
Author Unknown, "Cyruslink: Prepare for a New Audio Adventure," Cyrus Electronics, Reference No. DTV-QUR-0033941, 2004, 8 pages.
Author Unknown, "Frequently Asked Questions Regarding Finisar's 1000BASE-T SFPs (FCMJ-8520/8521-3)," Application Note AN-2036, Revision B, Mar. 4, 2004, Finisar Corporation, 9 pages.
Author Unknown, "Higher-Speed Physical Layer Extension in the 2.4 GHz Band," IEEE Standard 802.11b-1999(R2003), Reaffirmed Jun. 12, 2003, IEEE, New York, New York, 96 pages.
Author Unknown, "iPod User's Guide," Apple Computer, Inc., 2004, 64 pages.
Author Unknown, "Milestone CableHome 1.1 Certification Issued," Press Releases, Apr. 16, 2004, Cable Television Laboratories, Inc., 1 page.
Author Unknown, "NetRemote LE Installation Guide for J. River Media Center," Promixis, Internet Archive dated Jan. 20, 2005, JRiver, Inc., 6 pages.
Author Unknown, "NetRemote LE Network Configuration Guide," Promixis, Internet Archive dated Jan. 19, 2005, JRiver, Inc., 12 pages.
Author Unknown, "NetRemote LE Setup Guide," Promixis, Internet Archive dated Jan. 19, 2005, JRiver, Inc., 10 pages.
Author Unknown, "NetRemote," Promixis, LLC, Oct. 13, 2004, Internet Archive capture of http://www.promixis.com/products.php?section=netremote, accessed Dec. 17, 2014, 2 pages.
Author Unknown, "Network Connection Speeds Reference," http://www.ertyu.org/steven_nikkel/inetspeeds.html, Internet Archive dated Feb. 10, 2006, 4 pages.
Author Unknown, "New Scientific-Atlanta Cable Modem Provides Four Ethernet Ports for Expanded connectivity," PRNewswire-FirstCall, Jun. 16, 2004, Orlando, Florida, Scientific-Atlanta, Inc., 2 pages.
Author Unknown, "Public key infrastructure," Wikipedia, the free encyclopedia, accessed on Sep. 29, 2015, 7 pages.
Author Unknown, "Reference Guide: hp iPAQ Pocket PC h5400 Series," Document Part No. 281984-002, Hewlett-Packard Development Company, L.P., Apr. 2003, 273 pages.
Author Unknown, "Scientific-Atlanta Debuts DPR2325 Cable Modem Gateway," Aug. 1, 2004, Worldwide Videotex, 2 pages.
Author Unknown, "Sonos Digital Music System User Guide," Version 050801, Sonos, Inc., Aug. 2005, 114 pages.
Author Unknown, "Specification of the Bluetooth System," Master Table of Contents & Compliance Requirements and Excerpts of the Bluetooth Core Specification, Covered Core Package version 1.2, Issued Nov. 5, 2003, Bluetooth SIG, Inc., 90 pages.
Author Unknown, "Supplement to IEEE Standard for Information Technology—Telecommunications and Information Exchange between Systems—Local and Metropolitan Area Networks—Specific Requirements—," Part 11: Wireless LAN Medium Access Control (MAC) and Physical Layer (PHY) specifications: Higher-Speed Physical Layer Extension in the 2.4 GHz Band, IEEE Standard 802.11b-1999 (R2003), Institute of Electrical and Electronics Engineers, Reaffirmed Jun. 12, 2003, 96 pages.
Author Unknown, "Slingbox User Guide: Your guide to setting up and using the Slingbox," Sling Media, Inc., 2005, 92 pages.
Author Unknown, "The Authoritative Dictionary of IEEE Standards Terms," Book excerpt, Seventh Edition, 2000, IEEE, New York, New York, 6 pages.
Author Unknown, "The Residential Gateway Report & TIA/EIA Residential Gateway: IS-98-5," CABA Information Series, Dec. 1998, Continental Automated Buildings Association, 70 pages.
Author Unknown, "Toshiba Pocket PC e830 Series," User's Guide, First Edition, Toshiba Corporation, Aug. 2004, 230 pages.
Author Unknown, "Creative Sound Blaster Wireless Music," User's Guide, Version 1.0, Aug. 2003, Creative Technology Ltd, 66 pages.
Author Unknown, "User's Guide: HP iPAQ rx3000 Series Mobile Media Companion," Document Part No. 364351-002, Hewlett-Packard Development Company, L.P., Aug. 2004, 301 pages.
Author Unknown, "WebSTAR Cable Modems—User Guides," WebSTAR User's Guides, https://web.archive.org/web/

(56) References Cited

OTHER PUBLICATIONS

200602075352/http://scientificatlanta.com/products/consumers/webstar_userguides.htm, Internet Archive dated Feb. 7, 2006, Scientific-Atlanta, Inc., 1 page.
Author Unknown, "WebSTAR DPR2320 and DPR2325 Cable Modem Gateway User's Guide," User's Guide, Part No. 4003742, Revision B, Apr. 2005, Scientific-Atlanta Inc., Lawrenceville, Georgia, 104 pages.
Author Unknown, "WebSTAR DPR2325 Cable Modem Gateway with 802.11g Wireless Access Point," Subscriber Products, Part No. 7007866, Revision A, Jun. 2005, Scientific-Atlanta Inc., Lawrenceville, Georgia, 2 pages.
Author Unknown, "database." IEEE 100: The Authoritative Dictionary of IEEE Standards Terms, Seventh Edition, New York, New York, Institute of Electrical and Electronics Engineering, Dec. 2000, 3 pages.
Author Unknown. "T3." IEEE 100: The Authoritative Dictionary of IEEE Standards Terms, Seventh Edition, New York, New York, Institute of Electrical and Electronics Engineering, Dec. 2000, 6 pages.
Choi, Lai-U, et al., "On Cross-Layer Design for Streaming Video Delivery in Multiuser Wireless Environments," EURASIP Journal on Wireless Communications and Networking, vol. 2006, 2006, pp. 1-10.
Clark, David, et al., "Architectural Considerations for a New Generation of Protocols," ACM SIGCOMM, vol. 20, No. 1, pp. 200-208, Aug. 1990.
Cornea, Radu, et al., "Managing Cross-Layer Constraints for Interactive Mobile Multimedia," In Proceedings of the IEEE Workshop on Constraint-Aware Embedded Software, 2003, 6 pages.
De Vet, John, et al., "A Personal Digital Assistant as an Advanced Remote Control for Audio/Video Equipment," Proceedings of the Second Workshop on Human Computer Interaction with Mobile Devices, 1999, pp. 87-91.
Doherty, Richard, et al., "The Advent of Multi-Room Digital Music; An Overview of the Sonos Digital Music System," White Paper, The Envisioneering Group, Kyra Communications, Jan. 2005, 15 pages.
Finn, Norman, "What LinkSec Should Know About Bridges," Presented at IEEE P802 Link Security Executive committee Study Group, Revision 2, Mar. 2003, Dallas, Texas, 22 pages.
Greene, N. et al., "Media Gateway Control Protocol Architecture and Requirements," Request for Comments 2805, Apr. 2000, The Internet Society, 45 pages.
Den Hartog, F.T.H., et al., "Tackling the Complexity of Residential Gateways in an Unbundling Value Chain," Journal of Lightwave Technology, Jan. 2004, IEEE, 10 pages.
Holliday, C.R., "The Residential Gateway," Spectrum, vol. 34, Issue 5, May 1997, IEEE, pp. 29-31.
Joosten, H.J.M et al., "Specifications for the RGE Security Architecture: A case study for a novel security modeling methodology," Phillips Research Technical Note, PR-TN-2003/00399, Issued Jun. 2003, Koninklijke Philips Electronics NV, 84 pages.
Keegan, Jeff, "My Killer-App TiVo/TiVoWeb/PalmPilot Story," http://www.keegan.org/jeff/tivo/tivokillerappstory.html, Sep. 6, 2001, 7 pages.
Keegan, Jeff, "Hacking TiVo: The Expansion, Enhancement, and Development Starter Kit," Wiley Publishing, Inc., 2004, Indianapolis, Indiana, 60 pages.
Krikorian, Raffi, "TiVo Hacks: 100 Industrial-Strength Tips & Tools," Hacks 33 and 36 (excerpts) O'Reilly Media, Aug. 2003, 9 pages.
*Unified Patents Inc. (Petitioner) v. Qurio Holdings, Inc. (Patent Owner)*, Case IPR2015-01991, Decision Denying Institution of Inter Partes Review of U.S. Pat. No. 7,787,904, dated Apr. 4, 2016, 28 pages.
*Dish Network, L.L.C. (Petitioner), v. Qurio Holdings, Inc. (Patent Owner)*, Case IPR2016-00007, Decision on nstitution of Inter Partes Review of U.S. Pat. No. 7,787,904, dated Apr. 4, 2016, 25 pages.
*Directv, LLC (Petitioner) v. Qurio Holdings, Inc. (Patent Owner)*, Case IPR2015-02005, Decision on Institution of Inter Partes Review of U.S. Pat. No. 7,787,904, dated Apr. 4, 2016, 34 pages.
*Unified Patents Inc. (Petitioner) v. Qurio Holdings, Inc. (Patent Owner)*, Case IPR2016-00998, Petition for Inter Partes Review of U.S. Pat. No. 7,787,904, dated May 4, 2016, 64 pages.
*Unified Patents Inc. (Petitioner) v. Qurio Holdings, Inc. (Patent Owner)*, Case IPR2015-01940, Decision on Institution of Inter Partes Review of U.S. Pat. No. 8,102,863, dated Apr. 13, 2016, 28 pages.
*Dish Network L.L.C. (Petitioner) v. Qurio Holdings, Inc. (Patent Owner)*, Case IPR2016-00005, Decision on Institution of Inter Partes Review of U.S. Pat. No. 8,102,863, dated Apr. 4, 2016, 20 pages.
*Directv, LLC (Petitioner) v. Qurio Holdings, Inc. (Patent Owner)*, Case IPR2015-02007, Decision Denying nstitution of Inter Partes Review of U.S. Pat. No. 8,879,567, dated Apr. 4, 2016, 35 pages.
*Directv, LLC (Petitioner) v. Qurio Holdings, Inc. (Patent Owner)*, Case IPR2015-02006, Decision Denying nstitution of Inter Partes Review of U.S. Pat. No. 8,102,863, dated Apr. 4, 2016, 23 pages.
*Dish Network L.L.C. (Petitioner) v. Qurio Holdings, Inc. (Patent Owner)*, Case IPR2016-00080, Decision on nstitution of Inter Partes Review of U.S. Pat. No. 8,879,567, dated Apr. 25, 2016, 32 pages.
Petition for Inter Partes Review of Claims 17, 18, 20, 21 of U.S. Pat. No. 8,102,863 Under 35 U.S.C. §§ 311-319 and 37 C F R §§ 42.100 Et SEQ., Case IPR2016-00993, dated May 1, 2016, 59 pages.
Petition for Inter Partes Review of Claims 20, 21, 24 and 25 of U.S. Pat. No. 8,879,567 Under 35 U.S.C. §§ 311-319 and 37 C.F.R. §§ 42.100 Et Seq., Case IPR2016-00994, dated May 1, 2016, 66 pages.
Declaration of Dr. Charles Eldering in Support of Petition for Inter Partes Review of U.S. Pat. No. 7,787,904, dated May 4, 2016, 8 pages.

\* cited by examiner

HIGH-SPEED WAN TO WIRELESS LAN GATEWAY

RELATED APPLICATIONS

The present application is a continuation of U.S. application Ser. No. 13/329,992, entitled HIGH-SPEED WAN TO WIRELESS LAN GATEWAY, which was filed on Dec. 19, 2011; which was a continuation of Ser. No. 11/475,360, entitled HIGH-SPEED WAN TO WIRELESS LAN GATEWAY, which was filed on Jun. 27, 2006, and which issued as U.S. Pat. No. 8,102,863 on Jan. 24, 2012, the disclosures of which are hereby incorporated by reference herein in their entirety.

FIELD OF THE INVENTION

The present invention relates to a gateway device and more particularly relates to a gateway device interconnecting a high speed Wide Area Network (WAN) to a lower speed Wireless Local Area Network (WLAN).

BACKGROUND OF THE INVENTION

Historically, residential gateways provided a routing function from an in-home Local Area Network (LAN) to a Wide Area Network (WAN) based Asynchronous Digital Subscriber Line (ADSL) or Data Over Cable Service Interface Specification (DOCSIS) connection. Bandwidth available from the WAN ranged from 200 kbps to 6 Mbps. The LAN side of the gateway was either a single or multiple 10/100 Bt Ethernet connections serving client computers. Eventually, these Ethernet connections were replaced with wireless IEEE 802.11b/a/g LANs operating from 6 to 50 Mbps. The smaller bandwidth capabilities of the WAN versus the LAN kept downstream traffic flow simple in the gateway. Upstream traffic from the LAN to WAN was seldom an issue because users were less sensitive to this bottleneck. A typical upstream bottleneck scenario would be sending an email with a large attachment. In this situation, the Transfer Control Protocol (TCP) service of the gateway would simply throttle the LAN connection to the appropriate speed for the WAN.

With the advent of Fiber-to-the-Home (FTTH) networks, the traditional scenario described above has been reversed. In a FTTH network, a high speed FTTH data connection is provided to the residential gateway. The FTTH data connection provides data rates in the range of 1 to 10 Gbps. In contrast, the proposed IEEE 802.11n standard for wireless LANs provides data rates in the range of 100 to 500 Mbps. As such, the traditional residential gateway architecture will limit overall performance to the wireless LAN bandwidth, thereby negating much of the value of the FTTH connection. Thus, there is a need for an improved residential gateway architecture for interconnecting a high speed WAN to a lower speed wireless LAN.

SUMMARY OF THE INVENTION

The present invention relates to a gateway interconnecting a high speed Wide Area Network (WAN) and a lower speed Wireless Local Area Network (WLAN). The high speed WAN is preferably connected to the gateway via a Fiber-to-the-Home (FTTH) connection and associated FTTH modem. In general, the gateway includes an adaptable cross-layer offload engine operating to manage bandwidth between the high speed WAN and the lower speed WLAN. As data enters the gateway from the WAN at the high speed data rate of the WAN, the offload engine stores the data in a non-secure data cache. A rule check engine performs a stateless or stateful inspection of the data in the non-secure data cache. Once inspected by the rule check engine, the data is moved from the non-secure cache to the secure cache and thereafter transmitted to an appropriate user device in the WLAN at a lower data rate of the WLAN.

Prior to transmitting the data, the gateway may also perform additional functions such as, but not limited to, file format conversion, Digital Rights Management (DRM) encoding or decoding, and Data Encryption Standard (DES) encryption or decryption.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 3:
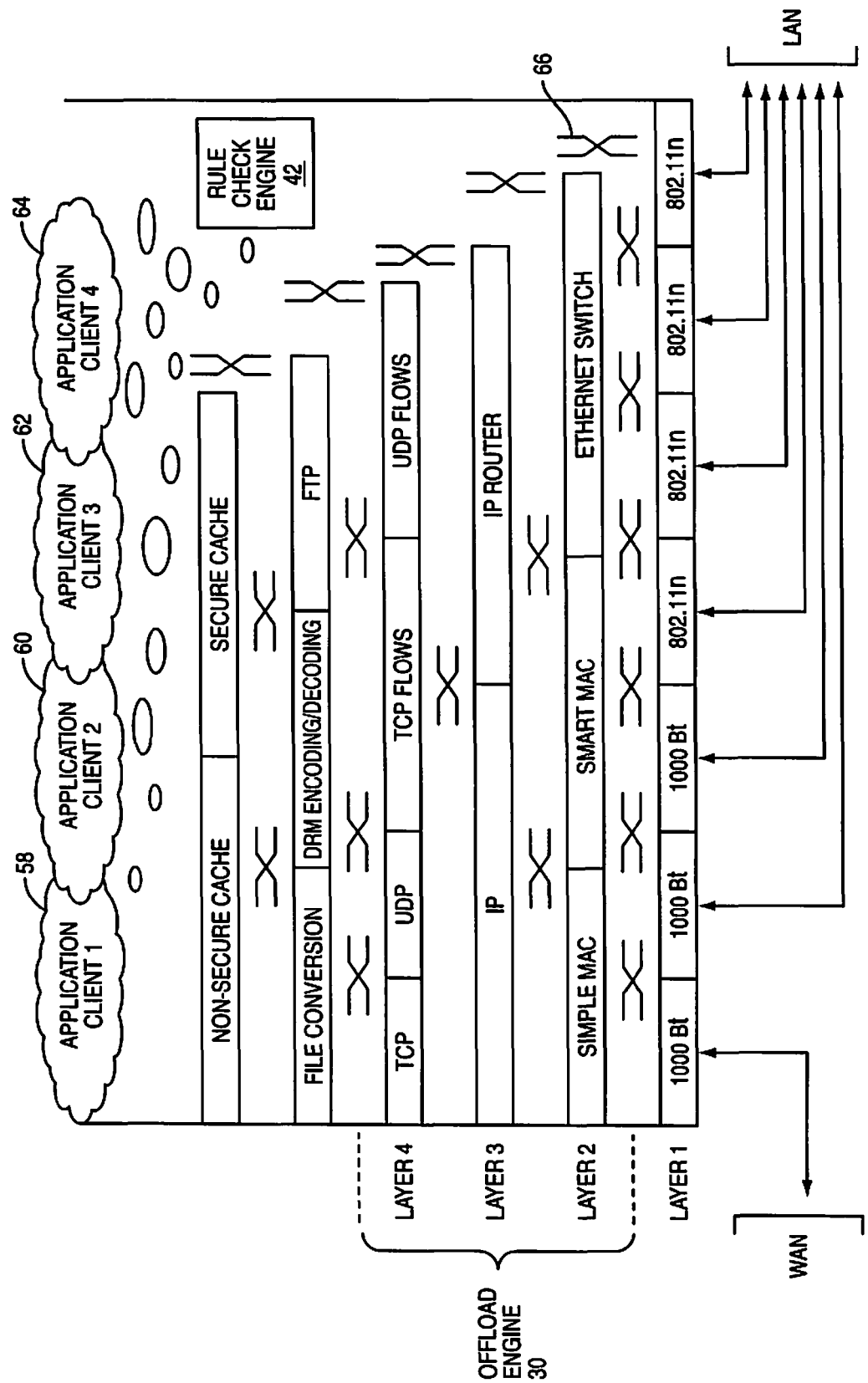
Figure 4:
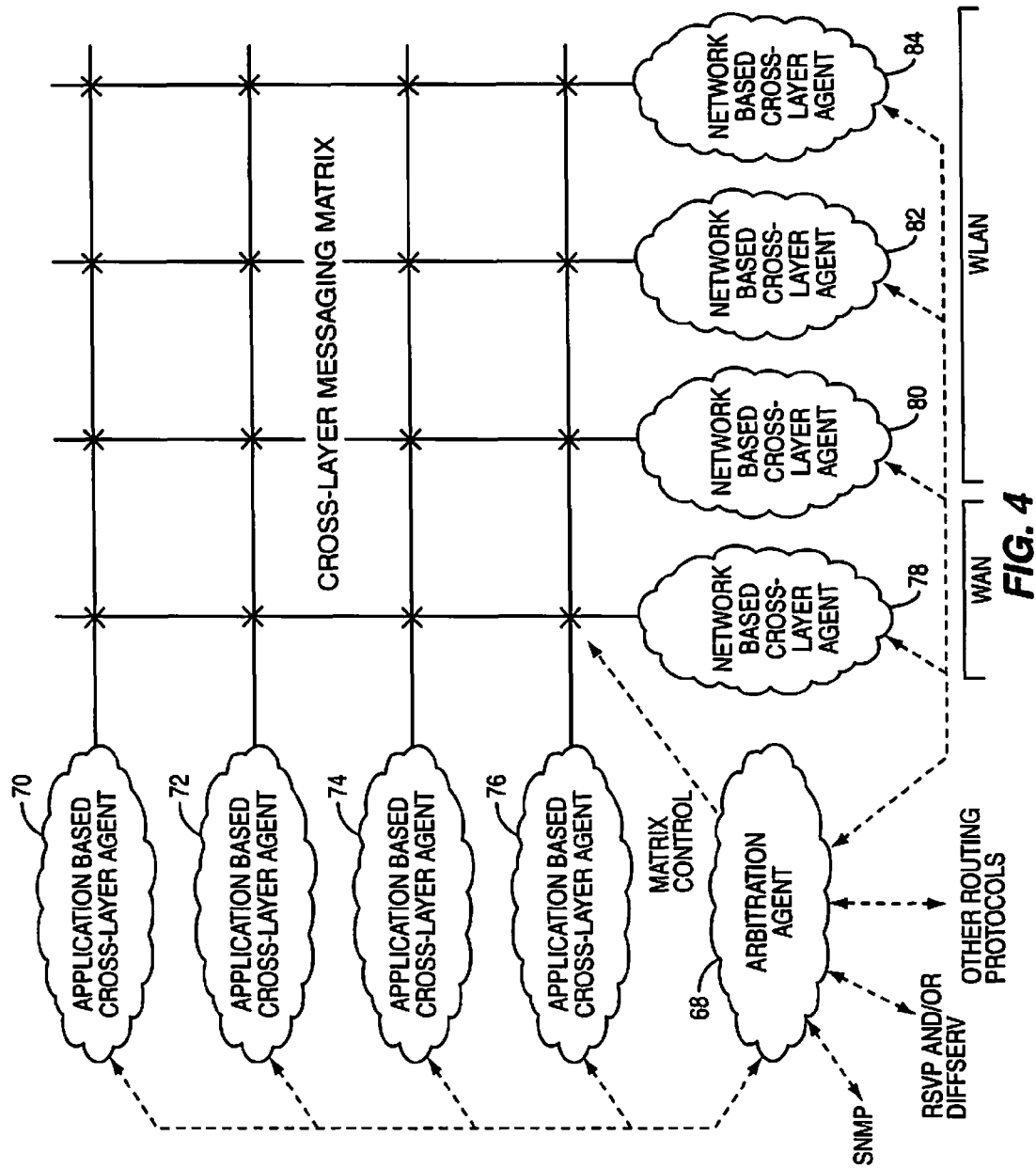

FIG. 3 is an exemplary protocol stack representation of the adaptable cross-layer gateway according to one embodiment of the present invention; and FIG. 4 illustrates an exemplary cross-messaging matrix controlled to provide a complete protocol stack having a cross-layer architecture for a network connection implemented by the adaptable cross-layer gateway according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
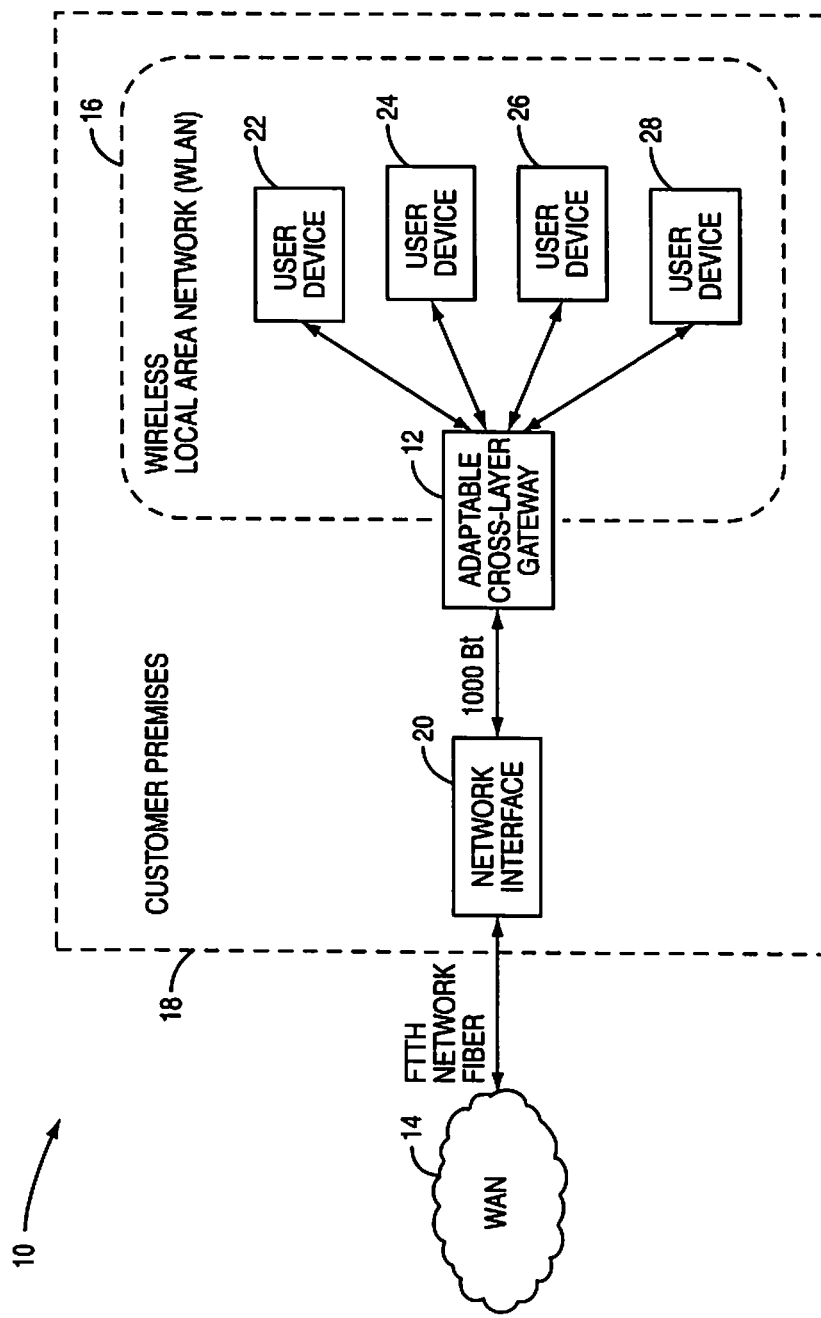
FIG. 1 illustrates a system including an adaptable cross-layer gateway for interconnecting, or bridging, a high speed Wide Area Network (WAN) to a lower speed Wireless Local Area Network (WLAN) according to one embodiment of the present invention.

FIG. 1 illustrates a system 10 including an adaptable cross-layer gateway 12 interconnecting, or bridging, a high speed WAN 14 and a lower speed WLAN 16 according to one embodiment of the present invention. In addition, as discussed below, the gateway 12 offloads data to data caches in order to take advantage of the high data rate provided by the high speed WAN 14. In addition, by using cross-layering techniques, the gateway 12 improves the performance of the WLAN 16 in order to take further advantage of the high speed WAN 14. The gateway 12 may be implemented in hardware or a combination of hardware and software. For example, the gateway 12 may include one or more Application Specific Integrated Circuits (ASICs), one or more Digital Signal Processors (DSPs), one or more Field Programmable Gate Arrays (FPGAs), or the like.

The WAN 14 may be a distributed public access network such as the Internet. Preferably, the WAN 14 provides a Fiber-to-the-Home (FTTH) connection to a customer premises 18, which in this example includes a network interface 20, the gateway 12, and the WLAN 16. FTTH generally refers to a broadband network where a fiber-optic connection is provided to the home. The FTTH connection provides data rates equal to or greater than 1 Gigabit per second (Gbps). For example, the FTTH connection may provide data rates in the range of and including 1 to 10 Gbps. The network interface 20 may be a FTTH modem providing an interface between the FTTH connection and the gateway 12. In this exemplary embodiment, the network interface 20 provides an optical to electrical Gigabit Ethernet connection (1000 Bt) to the gateway 12. It should be noted that while the preferred high speed connection to the WAN 14 is the FTTH connection discussed herein, the present invention is not limited thereto. The gateway 12 of the present invention may be used to interconnect, or bridge, any high speed WAN to a lower speed LAN regardless of the type of connection provided to the WAN. For example, the gateway 12 may interconnect an OC-192 (9.95328 Gbps) or 10 Gigabit Ethernet WAN to a multiport Gigabit Ethernet (1000 Bt) lower speed LAN.

The WLAN 16 may operate, for example, according to one or more of the suite of IEEE 802.11 standards such as the IEEE 802.11a, IEEE 802.11b, IEEE 802.11g, or the proposed IEEE 802.11n standards. The WLAN 16 is formed by the gateway 12 and a number of user devices 22-28 each having a wireless interface. The user devices 22-28 may be, for example, personal computers, Personal Video Recorders (PVRs), Personal Digital Assistants (PDAs), other Internet Protocol (IP) appliances, or the like, or any combination thereof.

Figure 2:
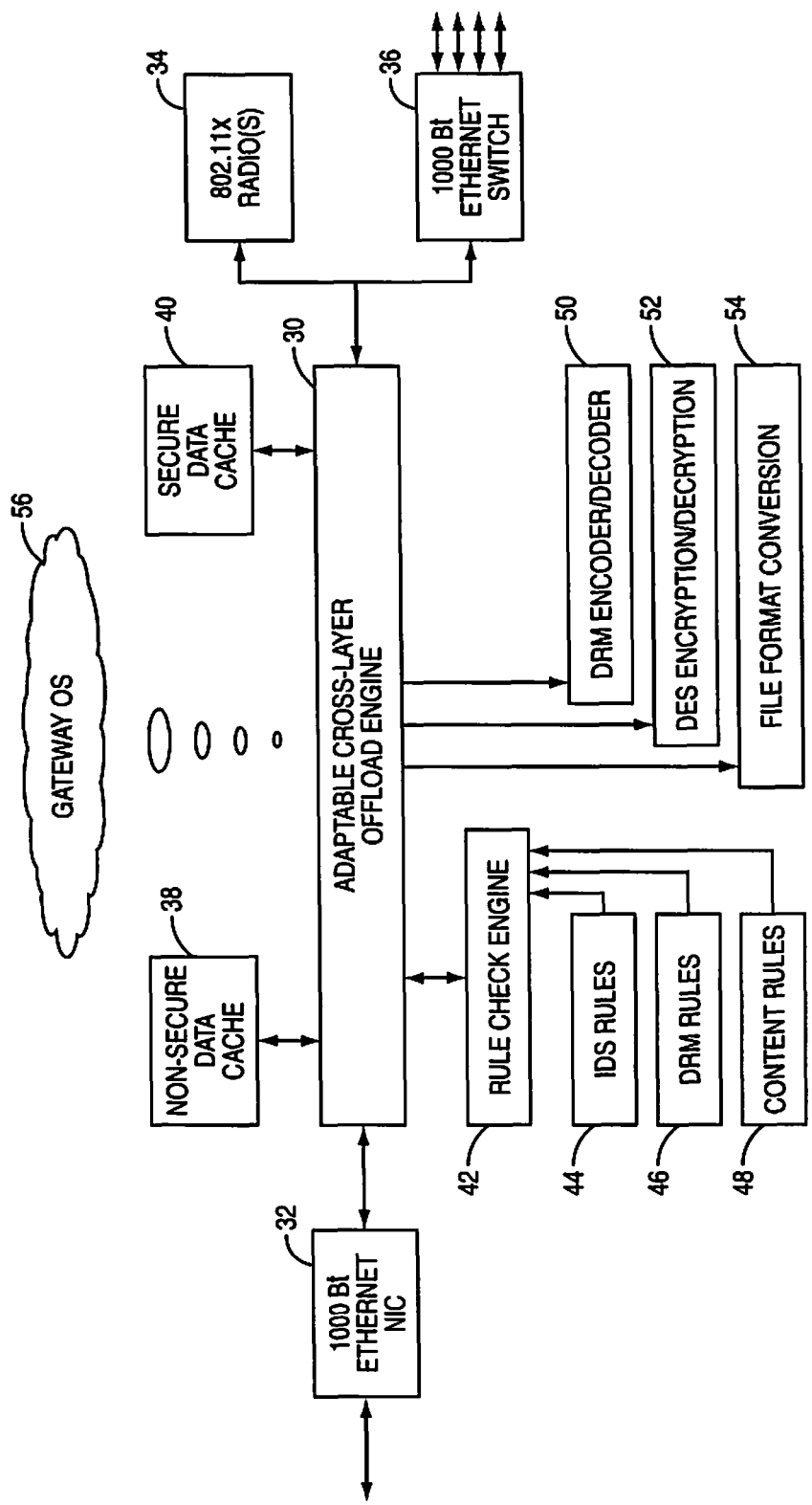
FIG. 2 is a block diagram of the adaptable cross-layer gateway of FIG. 1 according to one embodiment of the present invention.

FIG. 2 is a more detailed block diagram of the gateway 12 according to one embodiment of the present invention. At the heart of the gateway 12 is an adaptable cross-layer offload engine 30 that manages bandwidth, or traffic flow, between the WAN 14 and the WLAN 16. The offload engine 30 utilizes cross-layer functionality and is configurable to adapt to varying conditions in the WLAN 16. The offload engine 30 is preferably implemented in hardware, but may alternatively be implemented in software or a combination of hardware and software.

The offload engine 30 is communicatively coupled to the WAN 14 via, in this example, a Gigabit Ethernet Network Interface Card (NIC) 32, which is connected to the WAN 14 (FIG. 1) via the network interface 20. The NIC 32 may generally be referred to as a high speed network interface. The offload engine 30 is communicatively coupled to the WLAN 16, and more specifically the user devices 22-28 in the WLAN 16, via one or more wireless radios 34. In this example, the wireless radios 34 are IEEE 802.11n wireless radios. However, the present invention is not limited thereto. The gateway 12 may also include an Ethernet switch 36 or the like providing one or more wired connections to additional LAN devices.

The gateway 12 also includes a non-secure data cache 38 and a secure data cache 40. The non-secure and secure data caches 38 and 40 are used to buffer data as needed by the offload engine 30. While illustrated separately, the data caches 38 and 40 may be implemented in a single physical cache where, for example, flags are used to identify secure and non-secure data. The non-secure data cache 38 is used to store received data from the WAN 14 for inspection and processing prior to forwarding the data to the WLAN 16. The non-secure data cache 38 may also be used to buffer large data sets from the WLAN 16 waiting for transmission over the WAN 14. By buffering data in the non-secure data cache 38, the gateway 12 is enabled to take advantage of the full bandwidth provided by the FTTH connection. The secure data cache 40 is used to temporarily store data from the non-secure data cache 38 that has been inspected and cleared for transmission prior to transmission to the user devices 22-28 in the WLAN 16.

A rule check engine 42 operates to inspect the data in the non-secure data cache 38 according to a number of rules, which in this example include Intrusion Detection System (IDS) rules 44, Digital Rights Management (DRM) rules 46, and other general or specific content rules 48. The rule check engine 42 may perform stateless inspection, stateful inspection, or both stateless and stateful inspection. The IDS rules 44 are generally rules for detecting malicious network traffic and may include, for example, typical firewall rules. The DRM rules 46 may be rules for protecting media files, such as videos, songs, and images, stored on the user devices 22-28 within the WLAN 16 when transmitted over the WAN 14. In addition, the DRM rules 46 may include rules for identifying incoming content to be encoded as a security feature to prevent unauthorized viewing of the specified content by, for example, children within the WLAN 16. The content rules 48 may include rules regulating the types of content that may be accessed by the user devices 22-28 within the WLAN 16. In addition, as discussed below, the rule check engine 42 may inspect the data passing through the gateway 12 based on rules for triggering additional functions provided by the gateway 12.

The gateway 12 may also include various additional functional components such as, but not limited to, a DRM encoder/decoder 50, a Digital Encryption System (DES) encryption/decryption function 52, and a file format conversion function 54. The functions 50-54 may be triggered either directly or indirectly by the rule check engine 42 based on associated rules used to inspect data passing through the gateway 12.

The DRM encoder/decoder 50 may be implemented in hardware, software, or a combination of hardware and software, and may be used to protect content transmitted over the WAN 14 from the user devices 22-28 within the WLAN 16. In addition or alternatively, the DRM encoder/decoder 50 may be used in conjunction with firewall technology to create a security feature that prevents unauthorized viewing of specified content on the user devices 22-28. More specifically, in the outgoing direction, the DRM encoder/decoder 50 may operate to encode content leaving the WLAN 16. For example, personal videos, songs, images, or the like stored by the user devices 22-28 may be encoded by the DRM encoder/decoder 50 such that only desired recipients may view or play the content. As for incoming content, the DRM encoder/decoder 50 may, for example, encode specified types of content from the WAN 14 to prevent unauthorized viewing by, for example, children. License keys could be distributed by the gateway 12 to appropriate user devices 22-28 to unlock the encoded content. It should be noted that the present invention is not limited to DRM encoding or decoding. Other types of encoding and decoding may be used as desired.

The DES encryption/decryption function 52 may be implemented in the wireless radios 34. However, the present invention is not limited thereto. The DES encryption/decryption function 52 operates to provide encryption and decryption of data transmitted over the WLAN 16 as commonly understood in the art. Additionally, DES and DRM may share the same encryption/decryption functions.

The file format conversion function 54 may be implemented in hardware, software, or a combination of hardware and software, and may be used to reduce the size of or otherwise adapt incoming content in order to reduce the bandwidth required to transfer the content to the appropriate user devices 22-28. More specifically, the file format conversion function 54 may convert the content from a first file format to a second file format having reduced bandwidth requirements, reduce the quality of the content, or both. For example, the file format conversion function 54 may convert a Motion Pictures Experts Group (MPEG) Layer 2 (MPEG-2) video file to a MPEG Layer 4 (MPEG-4) video file, thereby reducing the bandwidth required to transfer the video file over the WLAN 16. In addition or alternatively, the file format conversion function 54 may reduce the quality of the content such that the bandwidth required to transfer the content over the WLAN 16 is also reduced. For example, the quality of video content may be reduced by reducing the resolution, bit rate, or frame rate. The file format conversion function 54 may process incoming content as the content is provided to the gateway 12 or after the content is entirely transferred to the gateway 12.

The gateway 12 also includes a gateway operating system (OS) 56, which operates to configure and control the operation of the offload engine 30, the rule check engine 42, and the various functions 50-54. The gateway OS 56 may include client agents loaded, or configured, by the user devices 22-28. Using these client agents, the gateway OS 56 may be configured to, for example, convert all incoming MPEG-2 files to MPEG-4 files for all of the user devices 22-28; convert all incoming MPEG-2 files to MPEG-4 files for the user device 22; convert all incoming MPEG-2 files to AVI files for the user device 24; block all video content to the user device 26; block only Internet Protocol (IP) streaming content to the user device 28; use DRM encoding on all multimedia content and restrict playback to the user device 22; and configure the gateway 12 to immediately cache e-mail with attachments and provide the e-mail and attachments to the appropriate one of the user devices 22-28 over available radio frequency (RF) spectrum using a background operation. The above operations are intended to be exemplary and as such should not be construed to limit the scope of the present invention. These configurations may be implemented by the gateway OS 56 as additional rules for the rule check engine 42.

In operation, when data is received from the WAN 14 via the NIC 32, the offload engine 30 offloads the data into the non-secure data cache 38. While in the non-secure data cache 38, the data is inspected by the rule check engine 42 based on the rules 44-48 and any additional rules from the gateway OS 56 for triggering the functions 50-54. Once the data is cleared for transmission, the data is transferred to the secure data cache 40 where the data remains until transmission to the appropriate user devices 22-28 over the WLAN 16. As for outgoing data, data from the user devices 22-28 in the WLAN 16 is received by the gateway 12. For large data sets, such as large data files, or optionally for all outgoing data, the offload engine 30 offloads the data into the non-secure data cache 38. Once the data is buffered, the data is transmitted over the WAN 14. In one embodiment, the data is buffered to the extent needed to take full advantage of the bandwidth provided by the FTTH connection. However, note that for small data transfers such as, for example, a Hypertext Transfer Protocol (HTTP) request, the gateway 12 may chose not to buffer the data.

FIG. 3 illustrates an Open Systems Interconnect (OSI) model of the gateway 12 showing the cross-layer implementation of the gateway 12 according to one embodiment of the present invention. The traditional OSI model allows communication and data exchange only between adjacent layers in the protocol stack. However, as illustrated in FIG. 3, the gateway 12 enables communication and data exchange between all layers, including non-adjacent layers, of the protocol stack. The connectivity of the various layers of the protocol stack is controlled by the gateway OS 56. More specifically, in this embodiment, the gateway OS 56 includes application clients 58-64, which are associated with corresponding applications such as, but not limited to, a File Transfer Protocol (FTP) application, an HTTP application, a Real-time Transfer Protocol (RTP) and RTP Control (RTPC) application, and a streaming MPEG application. The application clients 58-64 operate to control the connectivity of the various protocol stack layers, or adapt the cross-layering scheme, for transfers by the associated applications.

In this embodiment, the offload engine 30 corresponds to layers 2-4 of the illustrated protocol stack. In addition, as illustrated, numerous switches 66 provide interfaces between the various protocol stack layers. The switches 66 may be implemented in hardware or software. In one embodiment, the switches 66 are implemented as an internal bus of the offload engine 30.

As will be apparent to one having ordinary skill in the art upon reading this disclosure, the performance of the WLAN 16 can be significantly improved by using cross-layering techniques. By improving the performance of the WLAN 16, the WLAN 16 gains further advantage from the high bandwidth capabilities of the FTTH connection to the WAN 14. For example, cross-layering techniques may be used to remove, or bypass, layers such as the IP/IP Router layer (Layer 3) when transferring data between the user devices 22-28 in the WLAN 16. Further, when the gateway 12, or more specifically the associated application client 58-64, detects that a data transfer is between two of the user devices 22-28, the gateway 12 may establish a Layer 2 connection between the two user devices using the Ethernet Switch service. In either of these situations, the gateway 12 may notify associated cross-layer agents on the user devices 22-28 of the cross-layering technique used for transfers to the user devices 22-28.

As another example, if an incoming data transfer meets alternate transfer criteria, the gateway 12 may use cross-layering techniques to establish an alternate point-to-point wireless link between the gateway 12 and the particular one of the user devices 22-28 over an alternate wireless channel. The alternate wireless channel may be a wireless channel not used by the gateway 12 when performing normal access point functions. For example, the alternate wireless channel may be provided by a secondary wireless communication interface operating on a frequency channel that does not overlap with the primary wireless channels used by the gateway 12 for normal access point operation. An exemplary system that establishes alternate wireless channels based on alternate transfer criteria is disclosed in U.S. patent application Ser. No. 11/443,761, entitled SYSTEM AND METHOD FOR BYPASSING AN ACCESS POINT IN A LOCAL AREA NETWORK FOR P2P DATA TRANSFERS, filed May 31, 2006, which is hereby incorporated herein by reference in its entirety.

FIG. 4 illustrates a cross-layer messaging matrix that may be implemented by the gateway 12 to control the interconnections of the various protocol stack layers illustrated in FIG. 5. For a detailed discussion of the cross-layer messaging matrix, the interested reader is referred to U.S. patent application Ser. No. 11/443,882, entitled CROSS-LAYER ARCHITECTURE FOR A NETWORK DEVICE, filed May 31, 2006, which is hereby incorporated herein by reference in its entirety.

In general, an arbitration agent 68 operates to associate application based cross-layer agents 70-76 with one or more network based cross-layer agents 78-84 and to interconnect various layers of the protocol stack as needed to provide a complete cross-layer protocol stack for a given network connection. The application based cross-layer agents 70-76 are preferably sub-components of the application clients 58-64 (FIG. 3), respectively. As such, each of the application based cross-layer agents 70-76 are associated with a particular application such as a FTP application, an HTTP application, a RTP/RTPC application, a streaming MPEG application, or the like. The network based cross-layer agents 78-84 are each associated with one of the wireless network interfaces 34, or radios 34, of the gateway 12. The network based cross-layer agents 78-84 provide or facilitate information-sharing between and control of the low level protocol stack layers. For example, the network based cross-layer agent 78 may provide or facilitate information sharing between and control of layers 1-4 for a first wireless network interface, or wireless radio, 34 of the gateway 12. Further, the network based cross-layer agent 78 may be associated with the application based cross-layer agents 70-76 by the arbitration agent 68 using the cross-layer messaging matrix to facilitate information sharing between and control of the low level protocol stack layers and the upper protocol stack layers when desired.

In operation, for example, if incoming data is to be transferred to the user device 22 within the WLAN 16 via the FTP application, the arbitration agent 68 may determine that a particular wireless network interface, or wireless radio, 34 of the gateway 12 is capable of or preferred for providing a network connection to the user device 22. Then, by controlling the cross-layer messaging matrix, the arbitration agent 68 operates to interconnect the FTP application to the wireless network interface, or wireless radio, 34 via the protocol stack of the gateway 12, and interconnect the application based cross-layer agent 70 associated with the FTP application and the network based cross-layer agent 78 associated with the wireless network interface, or wireless radio, 34 to provide a complete protocol stack having a cross-layer architecture for the network connection.

Those skilled in the art will recognize improvements and modifications to the preferred embodiments of the present invention. All such improvements and modifications are considered within the scope of the concepts disclosed herein and the claims that follow.

What is claimed is:

1. A gateway interconnecting a first network to a second network comprising:
    an offload engine that is implemented in a cross-layer architecture enabling communication between non-adjacent layers in a protocol stack of the gateway;
    a data cache associated with the offload engine;
    a network interface communicatively coupling the offload engine to the first network and providing a first data rate;
    an interface associated with the offload engine and adapted to communicate with a plurality of user devices within the second network, the interface providing a second data rate that is less than the first data rate;
    wherein the offload engine is adapted to:
        receive content from the first network via the network interface at the first data rate;
        store received content in the data cache such that the first data rate is supported by the gateway; and
        transmit the stored content from the data cache to a corresponding one of the plurality of user devices in the second network via the network interface at the second data rate;
    a rule check engine adapted to inspect the content from the first network based upon at least one rule prior to transmitting the content to the corresponding one of the plurality of user devices in the second network, wherein the at least one rule comprises at least one Digital Rights Management (DRM) rule; and
    a DRM function initiated by the rule check engine based on the at least one DRM rule, wherein:
        the rule check engine is further adapted to inspect the content based on the at least one DRM rule to identify data to be processed by the DRM function and initiate the DRM function for the identified data; and
        the DRM function is adapted to encode the identified data such that encoded data is transmitted to the corresponding one of the plurality of user devices within the second network, and provide license keys for decoding the encoded data to desired ones of the plurality of user devices having permission to consume the encoded data.

2. The gateway of claim 1 wherein the network interface is coupled to the second network via a Fiber-to-the-Home (FTTH) connection.

3. The gateway of claim 1 wherein the network interface operates according to one of the plurality of IEEE 802.11 standards.

4. The gateway of claim 1 wherein the first data rate provided by the network interface is at least 1 Gigabit per second (Gbps).

5. The gateway of claim 4 wherein the second data rate provided by the second network is less than or equal to 500 Megabits per second (Mbps).

6. The gateway of claim 1 wherein the rule check engine performs a stateful inspection of the content.

7. The gateway of claim 1 wherein the rule check engine performs a stateless inspection of the content.

8. The gateway of claim 1 wherein the at least one rule comprises at least one intrusion detection rule for detecting malicious network traffic.

9. The gateway of claim 6 wherein the at least one rule comprises at least one content rule identifying a type of content to block from entering the second network.

10. The gateway of claim 1 further comprising a file format conversion function adapted to convert the content that is in a first file format to a second file format having lesser bandwidth requirements.

11. The gateway of claim 1 further comprising a conversion function adapted to convert the content corresponding to a media file having a first quality to a media file having a lesser quality, thereby reducing bandwidth requirements for transferring the media file over the second network.

12. The gateway of claim 1, wherein the rule check engine is further adapted to:
    inspect received content to identify data in a specified file format; and
    initiate a file format conversion function adapted to convert the content to a new file format having lesser bandwidth requirements prior to transmission of the identified data over the second network.

13. The gateway of claim 1, wherein the rule check engine is further adapted to:
inspect received content to identify data corresponding to a media file in a specified file format; and
initiate a conversion function adapted to reduce a quality of the media file prior to transmission of the identified data over the second network.

14. The gateway of claim 1 wherein the offload engine is further adapted to:
receive outgoing data from one of the plurality of user devices within the second network at the second data rate provided by the interface;
buffer the outgoing data in the data cache; and
transmit the outgoing data from the data cache to a desired end point via the network interface at the first data rate of the network interface.

15. The gateway of claim 14, wherein the
rule check engine is further adapted to inspect the outgoing data to identify data desired to be encoded prior to transmission over the first network and the DRM function is further
adapted to encode the identified data prior to transmission over the first network.

16. The gateway of claim 1 wherein the first network is a Wide Area Network (WAN).

17. The gateway of claim 1 wherein the second network is a Local Area Network (LAN).

18. A method of interconnecting a first network and a second network comprising:
receiving content from the first network at a first data rate;
offloading received content to a data cache;
transmitting the offloaded content from the data cache to a corresponding one of a plurality of user devices within the second network at a second data rate that is less than the first data rate of the first network, wherein the content is offloaded to the data cache such that the first and second data rates are supported;
inspecting the content in the data cache based on at least one Digital Rights Management (DRM) rule to identify data to be processed by a DRM function;
encoding the identified data using the DRM function such that the encoded data is transmitted to the corresponding one of the plurality of user devices within the second network; and
providing license keys for decoding the encoded data to desired ones of the plurality of user devices having permission to consume the encoded data.

19. The method of claim 18 wherein transmitting the content from the data cache comprises transmitting the content from the data cache according to an adaptable cross-layering scheme.

20. The method of claim 18 wherein receiving the content comprises receiving the content from the first network via a Fiber-to-the-Home (FTTH) connection.

21. The method of claim 18 further comprising inspecting the content from the first network in the data cache based upon at least one rule prior to transmitting the content to the corresponding one of the plurality of user devices in the second network.

22. The method of claim 18 further comprising:
inspecting received content to identify data in a specified file format;
converting the identified data to a new file format having lesser bandwidth requirements; and
transmitting the identified data in the new file format to the corresponding one of the plurality of user devices within the second network.

23. The method of claim 18 further comprising:
inspecting received content to identify data corresponding to a media file in a specified file format;
reducing a quality of the media file, thereby reducing bandwidth requirements of the media file; and
transmitting the reduced quality media file to the corresponding one of the plurality of user devices in the second network.

24. The gateway of claim 18 wherein the first network is a Wide Area Network (WAN).

25. The gateway of claim 18 wherein the second network is a Local Area Network (LAN).

26. A gateway device comprising:
a first interface for receiving content at a first data rate in a first format from a first network;
a data cache for storing received content;
a rules check engine for determining Digital Rights Management (DRM) rules for received content;
a format conversion function for processing received content from the first format to a second format having a different data rate requirement;
a DRM encoder for encoding the converted content for authorized devices of a second network; and
a second interface for transmitting the encoded content over the second network.

27. The gateway of claim 26 wherein the first network is a Wide Area Network (WAN).

28. The gateway of claim 26 wherein the second network is a Local Area Network (LAN).

29. The gateway of claim 28 wherein the LAN is a Wireless Local Area Network (WLAN).

30. The gateway of claim 29 wherein the WLAN operates according to one of the 802.11 standards.

31. A gateway device comprising:
a first interface for receiving content having a first bandwidth requirement in a first format from a first network;
a data cache for storing the content;
a rules check engine for determining Digital Rights Management (DRM) rules for the content;
a format conversion function for processing the content from the first format to a second format having a second lesser bandwidth requirement;
a DRM encoder for encoding the converted content for authorized devices of a second network; and
a second interface for transmitting the encoded content over the second network.

32. The gateway device of claim 31 wherein the first network is a Wide Area Network (WAN).

33. The gateway device of claim 31 wherein the second network is a Local Area Network (LAN).

34. The gateway device of claim 33 wherein the LAN is a Wireless Local Area Network (WLAN).

35. The gateway device of claim 34 wherein the WLAN operates according to one of the 802.11 standards.

36. The gateway device of claim 35 where the second interface establishes an alternate point-to-point wireless link between the gateway and the one of the plurality of user devices.

37. The gateway device of claim 31 wherein the first interface is an Ethernet interface.

38. The gateway device of claim 31 wherein the second interface is an Ethernet interface.

39. The gateway device of claim 31 further comprising an Ethernet switch providing one or more wired connections to the plurality of user devices.

40. The gateway device of claim 31 wherein the content is video content in an MPEG format.

41. The gateway device of claim 31 wherein the gateway provides a streaming MPEG application.

42. The gateway device of claim 31 wherein the second format is a reduced quality of the first format.

43. The gateway device of claim 31 wherein the reduced quality is selected from the group consisting of reduced resolution, reduced bit rate, and reduced frame rate.

44. A method comprising:
    receiving content having a first bandwidth requirement in a first format from a first network at a first interface;
    storing the content;
    determining Digital Rights Management (DRM) rules for the content;
    processing the content from the first format to a second format having a second lesser bandwidth requirement;
    encoding the converted content for authorized devices of a second network; and
    transmitting the encoded content over the second network from a second interface.

45. The method of claim 44 wherein the first network is a Wide Area Network (WAN).

46. The method of claim 44 wherein the second network is a Local Area Network (LAN).

47. The method of claim 46 wherein the LAN is a Wireless Local Area Network (WLAN).

48. The method of claim 47 wherein the WLAN operates according to one of the 802.11 standards.

49. The method of claim 44 where the second interface establishes an alternate point-to-point wireless link between the gateway and the one of the plurality of user devices.

50. The method of claim 44 wherein the first interface is an Ethernet interface.

51. The method of claim 44 wherein the second interface is an Ethernet interface.

52. The method of claim 44 further comprising an Ethernet switch providing one or more wired connections to the plurality of user devices.

53. The method of claim 44 wherein the content is video content in an MPEG format.

54. The method of claim 44 wherein the gateway provides a streaming MPEG application.

\* \* \* \* \*